United States Patent
van Savooijen et al.

(10) Patent No.: US 9,266,044 B2
(45) Date of Patent: Feb. 23, 2016

(54) COMBINATION OF A FILTER ELEMENT AND A CORE ELEMENT, AND A FILTER ELEMENT

(75) Inventors: Henk van Savooijen, Almelo (NL); Hendrikus Bernardus Dijkhuis, Deventer (NL); Pieter van Gisbergen, Arnhem (NL); Richard Theodorus Antonius Arts, Deest (NL); Marinus Johannes Berend van Boven, Wageningen (NL); Antti Sorri, Urjala (FI); Petteri Kapanen, Tampere (FI); Mikko Ylhäinen, Lempäälä (FI)

(73) Assignee: Parker Hannifin Manufacturing Netherlands (Filtration) B.V., Arnhem (NL)

( * ) Notice: Subject to any disclaimer, the term of this patent is extended or adjusted under 35 U.S.C. 154(b) by 1167 days.

(21) Appl. No.: 13/264,446

(22) PCT Filed: Oct. 30, 2009

(86) PCT No.: PCT/NL2009/000205
§ 371 (c)(1),
(2), (4) Date: Oct. 14, 2011

(87) PCT Pub. No.: WO2010/120167
PCT Pub. Date: Oct. 21, 2010

(65) Prior Publication Data
US 2012/0037549 A1 Feb. 16, 2012

(30) Foreign Application Priority Data

Apr. 17, 2009 (NL) .................................... 2002763

(51) Int. Cl.
B01D 35/147 (2006.01)
B01D 29/15 (2006.01)

(52) U.S. Cl.
CPC .............. *B01D 35/147* (2013.01); *B01D 29/15* (2013.01); *B01D 2201/0415* (2013.01); *B01D 2201/316* (2013.01); *B01D 2201/347* (2013.01)

(58) Field of Classification Search
None
See application file for complete search history.

(56) References Cited

U.S. PATENT DOCUMENTS 4,721,563 A * 1/1988 Rosaen ........................ 210/85
5,374,355 A 12/1994 Habiger et al.
(Continued)

FOREIGN PATENT DOCUMENTS

DE 20006974 U1 9/2001
EP 0547291 A1 6/1993
(Continued)

OTHER PUBLICATIONS

English machine translation of DE 20006974.
(Continued)

*Primary Examiner* — Terry Cecil
(74) *Attorney, Agent, or Firm* — Hoffmann & Baron, LLP

(57) ABSTRACT

A combination (10) of a replaceable filter element (21) and a core element (38) is provided, the filter element comprising a tubular wall (25) of filtration medium for collecting material in a fluid stream passing through the tubular wall (25), a first end part (26) and a second end part. The core element (38) comprises a perforated tube (39) having transverse outer dimensions smaller than transverse inner dimensions of the tubular wall (25), and a bypass valve member (35) provided at one end of the perforated tube (39). The bypass valve member (35) is tubular and moveably attached to the perforated tube (39) for movement in axial direction with respect to the perforated tube (39) between an extended position and a retracted position. The first end part (26) of the filter element (21) comprises an axial passage (29) configured to receive the bypass valve member (35) slideable and sealingly.

38 Claims, 12 Drawing Sheets

(56) References Cited

U.S. PATENT DOCUMENTS

| | | |
|---|---|---|
| 5,490,930 A * | 2/1996 | Krull .......................... 210/443 |
| 5,770,054 A | 6/1998 | Ardes |
| 6,818,122 B2 * | 11/2004 | Mouhebaty .................. 210/132 |
| 6,955,755 B2 * | 10/2005 | Jainek ........................ 210/130 |
| 2001/0035376 A1 * | 11/2001 | Dworatzek ................. 210/440 |
| 2007/0000830 A1 | 1/2007 | Snider et al. |
| 2008/0308486 A1 | 12/2008 | Hacker |
| 2009/0057218 A1 | 3/2009 | Hanase et al. |

FOREIGN PATENT DOCUMENTS

| | | |
|---|---|---|
| WO | 2006010987 A1 | 2/2006 |
| WO | WO 2008128150 A2 * | 10/2008 |

OTHER PUBLICATIONS

English machine translation of EP 0547291 A1.

* cited by examiner

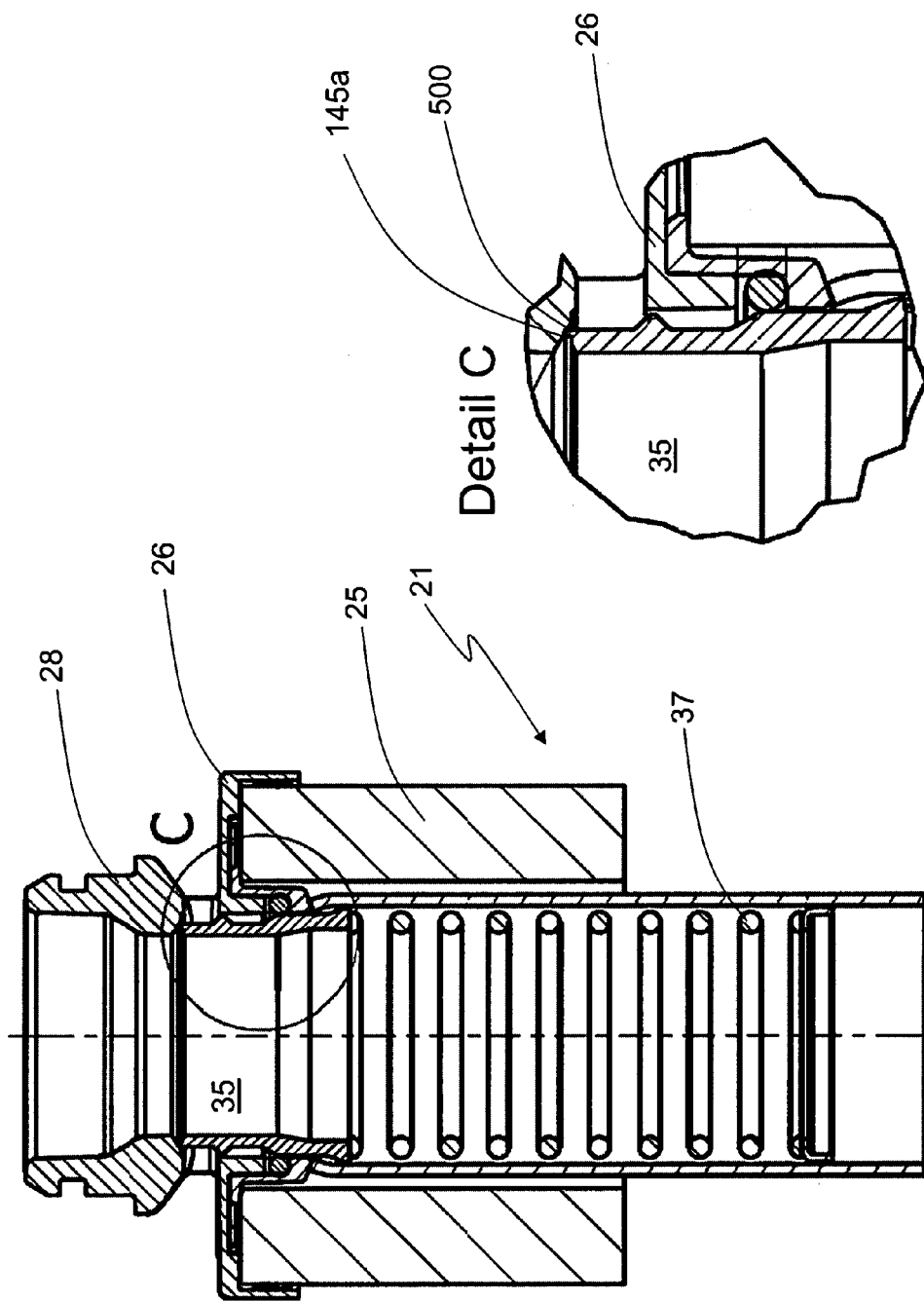

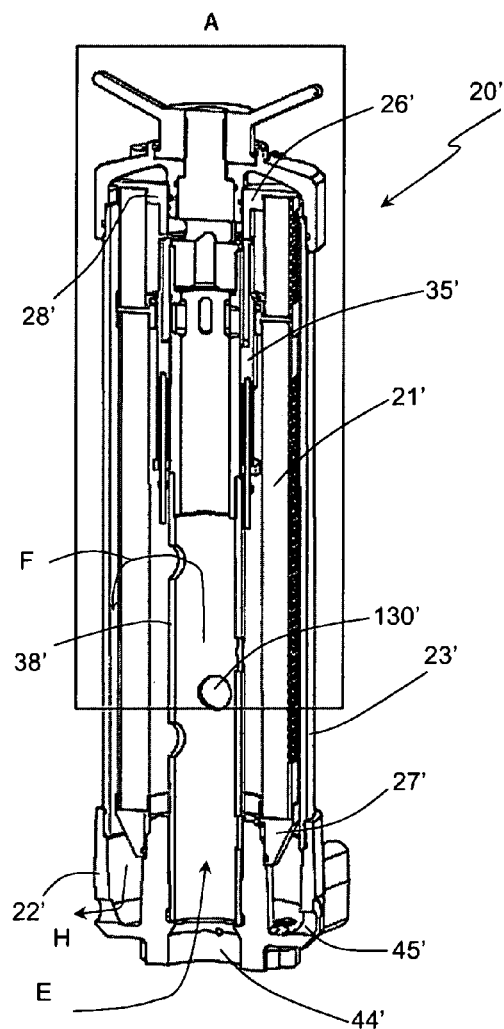
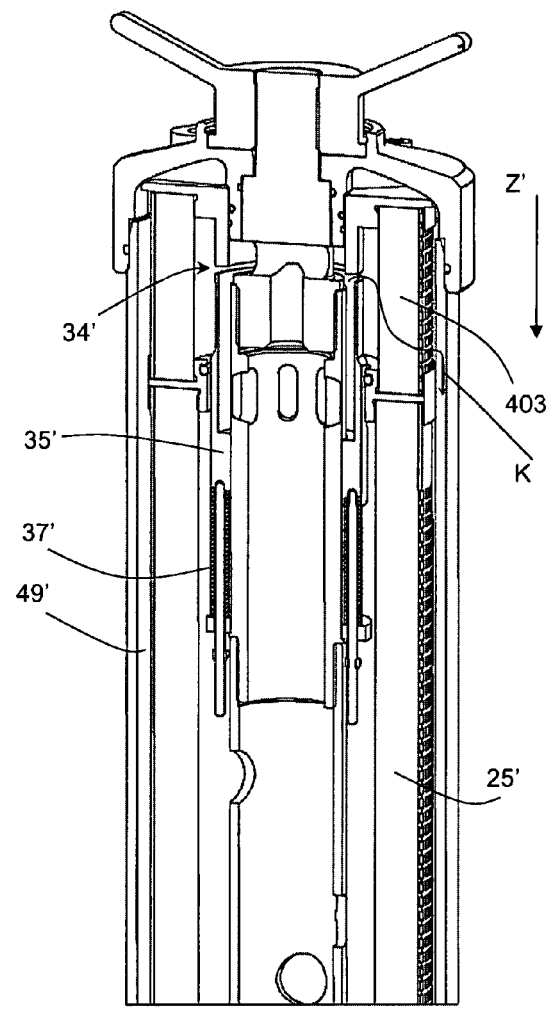
Fig. 5A
Fig. 5B

COMBINATION OF A FILTER ELEMENT AND A CORE ELEMENT, AND A FILTER ELEMENT

CROSS-REFERENCE TO RELATED APPLICATIONS

This application is the National Stage of International Application No. PCT/NL2009/000205, filed Oct. 30, 2009, which claims the benefit of Netherlands Application No. 2002763, filed Apr. 17, 2009, the contents of which is incorporated by reference herein.

FIELD OF THE INVENTION

The present invention in general relates to the field of filter systems. Such filter systems commonly comprise a filter element, a filter housing for accommodating the filter element. The filter element comprises a tubular filtration medium for collecting material entrained in a fluid stream passing through the tubular wall, i.e. the entrained material is filtered by the filtration medium. Further, such filter systems may be provided with a bypass valve member which allows the filtration medium to be bypassed by the fluid flow in certain situations. In relation to the present invention fluids may comprise liquids, gasses or gaseous media, liquids containing gas etc. In particular the present invention relates to the field of filter systems comprising replaceable filter elements, i.e. filter elements that can be replaced when they become clogged with entrained material.

BACKGROUND OF THE INVENTION

Filter systems, or filter assemblies, have for example been employed in a variety of applications including hydraulic systems, fuel systems and engine lubrication systems. Application of filter systems for filtering gaseous media are also known. Such assemblies for example use replaceable or exchangeable filter elements that can be installed on a filter head for filtering fluid flowing from an inlet to an outlet port in the filter head while passing through the filtration medium of the filter element. The filter element typically is contained within a filter housing such as a can that can be attached to and be detached from the filter head by means of a rotational connection means such as thread or the like.

Often filter systems are provided with a so-called core element, which may be in the form of a perforated tube which is for example arranged along an inner surface of the filtration medium of the filter element. The core element provides mechanical support to the filtration medium, which normally has a limited structural strength. Hence, a core element provides support to prevent the filtration medium from deforming under the pressure difference that exists across it.

In a so-called spin-on filter, the can, and the filter element are formed as one integral unit, which unit is—when replacing the filter element—removed and discarded as one unit. An integral unit is according to the present application to be understood as a unit which can essentially only be divided into its individual components or elements by destroying the connective parts of the unit.

In other configurations, only the filter element is replaced and the core element and/or the filter housing is reused.

In these kinds of configurations, the filter element, on the one hand, and the core element and/or the filter housing on the other hand form two separate structural units. The invention especially relates to these kinds of configurations, wherein the filter element on the one hand and the core element on the other hand, form two separate structural units. Alternatively, the filter element on the one hand and the core element plus the filter housing on the other hand, form two separate structural units. In the latter alternative case to which the present invention also relates, the core element will be fitted to the filter housing. According to the invention "two separate structural units" means two units which can be assembled together as well as be disassembled from each other whilst maintaining the structural integrity of each of said separate units.

During use the filter element may become clogged to the point that is causes a problem in the system, such as inadequate flow to components downstream of the filter, excessive pressure upstream of the filter element, and/or damage to the filter element allowing the accumulated contaminants to flow to components downstream of the filter element. Normally this is avoided by scheduled replacement of the filter element, or when the system indicates that replacement is required. It is thus necessary to replace the filter element from time to time.

Filter elements commonly have a wall of a filtration medium and an end cap, or end part, with an inlet (or outlet) which can be sealed to the head part of the housing to provide a flow path for a fluid stream to be supplied to the interior or space (or to be extracted from the space) within the filter element. The inlet (or outlet) is provided by a port or passage on the end part of the filter element. The port may e.g. have an O-ring seal on its external surface which is received in a bore within the housing, in which it is compressed to form a seal. Often, such a filtration medium has a cylindrical shape. The fluid to be filtered enters the filter assembly via the inlet, the inlet being arranged in such manner that the fluid can distribute along the outer surface of the filtration medium. The fluid is then forced through the filtration medium whereby contaminants (material) in the fluid remain captured in the filter member and the filtered fluid is forced to an outlet of the filter assembly. As an alternative, the flow may be in opposite direction; the contaminated fluid entering the filter element axially and then being forced through the filtration medium thereby flowing substantially radially outward.

Filter assemblies as described can e.g. be applied to filter oil of a lubrication system or an hydraulic system of e.g. a crane. In order to maintain the fluid flowing through the system (i.e. comprising tubing and a filter assembly), a pump is required. This is due to the fact that both the tubing and the filter assembly represent a resistance for the fluid flow. In general, the pump can be driven by an electrical motor or a combustion engine such as diesel engine for example.

In order to gain access to the filter element when it has to be replaced (exchanged), the head and body parts of the housing can be separated. When the filter element is replaced, also any end cap assemblies or end parts attached to it are replaced with it. Many of such end cap assemblies are provided with a so-called bypass flow valve assembly. Such a valve assembly is provided to allow the fluid to be filtered to bypass the filtration medium in case that the pressure difference over the filtration medium has increased beyond allowable limits. Such an occasion exists for example when the filter member has become clogged or needs replacement, but has not yet been replaced. Also other instances in which the pressure in the fluid system increases beyond allowable limits are conceivable. In such cases the bypass flow valve opens and a bypass flow is established. When such a filter element is replaced, also the bypass flow valve assembly provided in it is replaced. This is also true for the above-mentioned spin-on filters of course.

On the one hand this produces additional waste and on the other hand a relatively expensive assembly is discarded when a filter element is replaced.

It is also known to arrange a bypass valve in the head portion. In general this is done by providing a bore connecting the inlet of the head to the outlet of the head, wherein the bypass valve is arranged in the bore to open in case a predefined pressure is exceeded.

OBJECT OF THE INVENTION

The present invention aims to provide an improved filter assembly, or at least an improved combination of a core element and a filter element, that produces less waste when the filter element is replaced. The present invention further aims to provide a filter assembly that is simpler in design.

SUMMARY OF THE INVENTION

The present invention solves this problem by providing a combination of a core element and a replaceable filter element, wherein the filter element comprises a tubular wall of filtration medium for collecting material entrained in a fluid stream, such a fluid stream passing through the tubular wall during use of the filter element, and a first end part provided at a first axial end of the filter element. The core element comprises a perforated tube having transverse outer dimensions which are smaller than the transverse inner dimensions of the tubular wall and over which tube the filter element is removably receivable, and a bypass valve member provided at one end of the perforated tube. The bypass valve member is tubular and moveably coupled to the perforated tube for movement in axial direction with respect to the perforated tube between an extended position and a retracted position. The first end part of the filter element comprises an axial passage configured to receive the bypass valve member slideable and sealingly when the filter element is received over the perforated tube of the core element.

By providing that the bypass valve member is moveably coupled to the perforated tube of the core element, the bypass valve member is no longer part of the of the filter element. Within the meaning of the present invention this means that the bypass valve member and the perforated tube—together forming the core element—are coupled together in a manner that allows axial movement of the bypass valve member with respect to the perforated tube on the one hand, but prevents the bypass valve member to become detached from the perforated tube when the filter element is exchanged. In other words, the filter element and core element are separate structural units. More in particular, the filter element is removably receivable over the core element which means that when the filter element is removed from the core element, the bypass valve member will remain coupled to the perforated tube. Axial movement of the bypass valve member is limited by its coupling to the perforated tube. The bypass valve member is not coupled or attached to the filter element. The interaction between the filter element and the bypass valve member of the core element is defined by the axial passage of the first end part of the filter element, i.e. the bypass valve member is slideable and sealingly received in the axial passage. The bypass valve member is only coupled to the perforated tube of the core element. Hence, upon replacement of the filter element the bypass valve member is not automatically replaced also as it remains coupled (attached) to the perforated tube. Only replacement of the core element may result in replacement of the bypass valve member. This results in a simpler design of the filter element and in reduced waste when the filter element is exchanged.

Furthermore, as the bypass flow member is a tubular member it can be positioned such that the fluid flow through a filter assembly—comprising the combination of the filter element and the core element according to the invention—will not, in any case hardly, be influenced by the presence of the bypass valve member because this fluid flow passes essentially unhindered axially through the internal of the tubular bypass valve member. This will result in less turbulence in the fluid flow and thus will result in a lower pressure drop. Lower pressure drop in turn results in lower levels of power required for fluid pumps etcetera. Further in retracted position of the bypass valve member, i.e. when bypass flow bypassing the filter element is allowed, the fluid to bypass the tubular wall of filtration medium can simply pass—outside the filter element—radially along the first axial end of the filter element. This allows the bypass flow to bypass the filter element with reduced pressure drop and less turbulence.

In an embodiment of the invention a first annular seal member is provided in the axial passage for sealing engagement with the bypass valve member. This implies that the filter element and the bypass flow member are designed to co-operate. This in turn means that only filter elements can be used that are provided with this sealing ring avoiding that a user installs a wrong filter element. This reduces the risk of damage.

In a further embodiment of the invention the first end part comprises a tubular portion defining the axial passage, the tubular portion having a proximal tube portion and a distal tube portion with respect to the filtration medium, wherein the tubular portion comprises a wall, which is provided with a radial flow passage, which radial flow passage is provided between the proximal tube portion and the distal tube portion. In the extended position, the bypass valve member radially overlaps the radial flow passage to close the radial flow passage. As the radial flow passage is located between the said tube parts, the bypass valve member extends in the extended position inside the tubular portion increasing the structural stability of the bypass valve member. In the retracted position, the radial flow passage is at least partly exposed by the bypass valve member to allow flow in radial direction between the internal of the tubular portion and external of the tubular portion. This provides an assembly of a bypass valve member and a flow passage that is closed and/or, at least partially, opened by the bypass valve member that very good flow properties. The tubular portion hence acts as a valve seat housing for the bypass valve member.

In an embodiment of the invention the tubular portion is internally provided with a first seal member for sealing engagement with the bypass valve member. This first seal member, which is attached to the tubular portion, provides a very good seal between the bypass valve member and the tubular portion. In case of a tubular portion with radial flow passage, this first seal member might be provided proximally—viewed from the internal of the tubular wall of filtration medium—of the radial flow passage. This prevents leakage between the internal of the tubular wall of filtration medium and the external of the filter element. The first seal member is preferably annular. The first seal member can for example be an O-ring or other ring shaped seal element. The first seal member might be resilient and/or elastomeric.

In an embodiment of the invention, the tubular portion is internally provided with a second seal member to engage sealingly with an axial end of the bypass valve member when the bypass valve member is in the extended position. This second seal member, which is attached to the tubular portion, provides that especially in closed condition of the bypass valve member a very good seal between the bypass valve member and the tubular portion is ensured so that bypass leakage is prevented. In case of a tubular portion with radial flow passage bypass leakage is especially prevented when this second seal member is provided distally—viewed from the internal of the tubular wall of filtration medium—of the radial flow passage. This second seal member is preferably annular. This second seal member can for example be an O-ring or other ring shaped seal element. The second seal member might be resilient and/or elastomeric. It is however also possible to provide a sealing ridge as second seal member. In the extended position the bypass valve member will rest with its distal axial end against the sealing ridge. In order to improve the sealing, the second seal member is provided with a seal part of a material different than the tubular portion, which material is preferably resilient and/or an elastomeric material.

In an embodiment the tubular portion is provided with a seal part to engage sealingly with an axial end of the bypass valve member when the bypass valve member is in the extended position, and preferably the bypass valve member is provided a sharp-edged rim on its axial end, which rim extends in axial direction towards the seal part. The rim will, when the bypass valve member is in the extended position, form a seal between the end cap assembly and the bypass valve member due to the sharp-edged shape thereof.

In an embodiment the bypass valve member is provided a seal member on its axial and that faces the seal part, which provides an alternative to providing the seal member in the end cap assembly.

In an embodiment of the invention the tubular portion is externally provided with a third seal member for sealing engagement in an aperture of a filter device, which third seal member is provided distally from the radial flow passage. This third seal member is attached to the tubular portion. In this manner the filter element is sealingly attachable to a housing of a filter assembly. In case of a tubular portion with radial flow passage this third seal member is provided distally—viewed from the internal of the tubular wall of filtration medium—of the radial flow passage. The third seal member is preferably annular. The third seal member can for example be an O-ring or other ring shaped seal element. The third seal member might be resilient and/or elastomeric.

In an embodiment of the invention, the core element is provided with a resilient member pretensioning the bypass valve member towards the extended position. The resilient member preferably being a helically wound, cylindrical spring arranged inside the core element, providing an automatically operating bypass valve member. Furthermore, providing the core element with the resilient member reduces the complexity of the design of the filter element.

Preferably the resilient member pretensions the bypass valve member towards the extended position when the bypass valve member is in the extended position, providing a very well controllable opening and closing of the radial flow passage.

In an embodiment of the invention the bypass valve member is provided with a pressure ridge facing in the direction of the extended position to press the bypass valve member towards the retracted position under the influence of the pressure exerted by the fluid on the pressure ridge. This is a very convenient way of designing the bypass valve member. The pressure exerted on the ridge by the fluid will—when exceeding a certain value, like predetermined pressure value or pressure difference over the tubular wall of filtration medium—so to say automatically open the radial flow passage for allowing a bypass flow.

In an embodiment of the invention the bypass valve member is made from a wear-resistant material, in particular a metal, more in particular steel. Bypass flow valves of known filter systems are usually made of the same material as the end cap assembly it is part of, which is usually made from a plastic material. This may be problematic in view of life expectancy of the bypass flow valve. Furthermore, the seal that is achieved between a metal bypass valve member and a plastic end cap assembly is significantly better than between a plastic bypass valve member and a plastic end cap assembly. Hence, providing a bypass valve member that is made from a wear-resistant material greatly improves the life span of the bypass valve member. Furthermore, in particular when the bypass valve member is made from a metal, e.g. steel, the surface of the bypass valve member is relatively hard which provides an excellent performance when seals are provided that seal against that surface.

According to a further aspect of the invention a filter element is provided, which filter element comprises a tubular wall of filtration medium for collecting material entrained in a fluid stream passing through the tubular wall, a first end part provided at a first axial end of the filter element and a second end part provided at a second axial end of the filter element. The first end part of the filter element comprises an axial passage configured to receive slideable and sealingly a bypass valve member of a core element. The core element comprises a perforated tube having transverse outer dimensions that are smaller than transverse inner dimensions of the tubular wall. The bypass valve member is provided at one end of the perforated tube, is tubular and moveably attached to the perforated tube for movement in axial direction with respect to the perforated tube between an extended position and a retracted position. The first end part comprises a tubular portion defining the axial passage. The tubular portion comprises a wall which is provided with a radial flow passage configured to be radially overlapped by the bypass valve member for closing the radial flow passage when the bypass valve member is in the extended position, and to be exposed at least partly by the bypass valve member when the bypass valve member is in the retracted position to allow flow in radial direction between the internal of the tubular portion and external of the tubular portion.

According to a further aspect of the present invention a filter element is provided that comprises a tubular wall of filtration medium for collecting material entrained in a fluid stream passing through the tubular wall, and a first end part provided at a first axial end of the filter element. The first end part comprises a tubular portion having a proximal tube portion and a distal tube portion, said tubular portion having a wall that defines an axial flow passage that is open, at one end, axially towards an internal of the tubular wall and is open, at the opposing end, axially towards an external of the tubular portion. The tubular portion is provided with a radial flow passage, provided between the proximal tube portion and the distal tube portion, which radial flow passage that is radially open towards the external of the tubular portion and towards an internal of the tubular portion. Further a first seal member is provided which extends inside the tubular portion along the circumference of the tubular portion, wherein, viewed from an internal of the tubular wall, the first seal member is proximal from the radial passage.

Additionally a second annular seal member may be provided which extends inside the tubular portion along the circumference of the tubular portion, wherein, viewed from the internal of the tubular wall, the second seal member is arranged distally from the radial passage; and/or a third annular seal member might be provided which extends outside the tubular portion along the circumference of the tubular portion.

BRIEF DESCRIPTION OF THE DRAWINGS

Further advantageous embodiments of a filter assembly comprising a filter element and a combination of such a filter element and a core element according to the invention are described in the claims and in the following description with reference to the drawings, in which:

FIG. 4C shows an alternative embodiment of a filter assembly;

FIG. 4D shows a detail of the filter assembly of FIG. 4C;

DETAILED DESCRIPTION OF EXAMPLES

Figure 1:
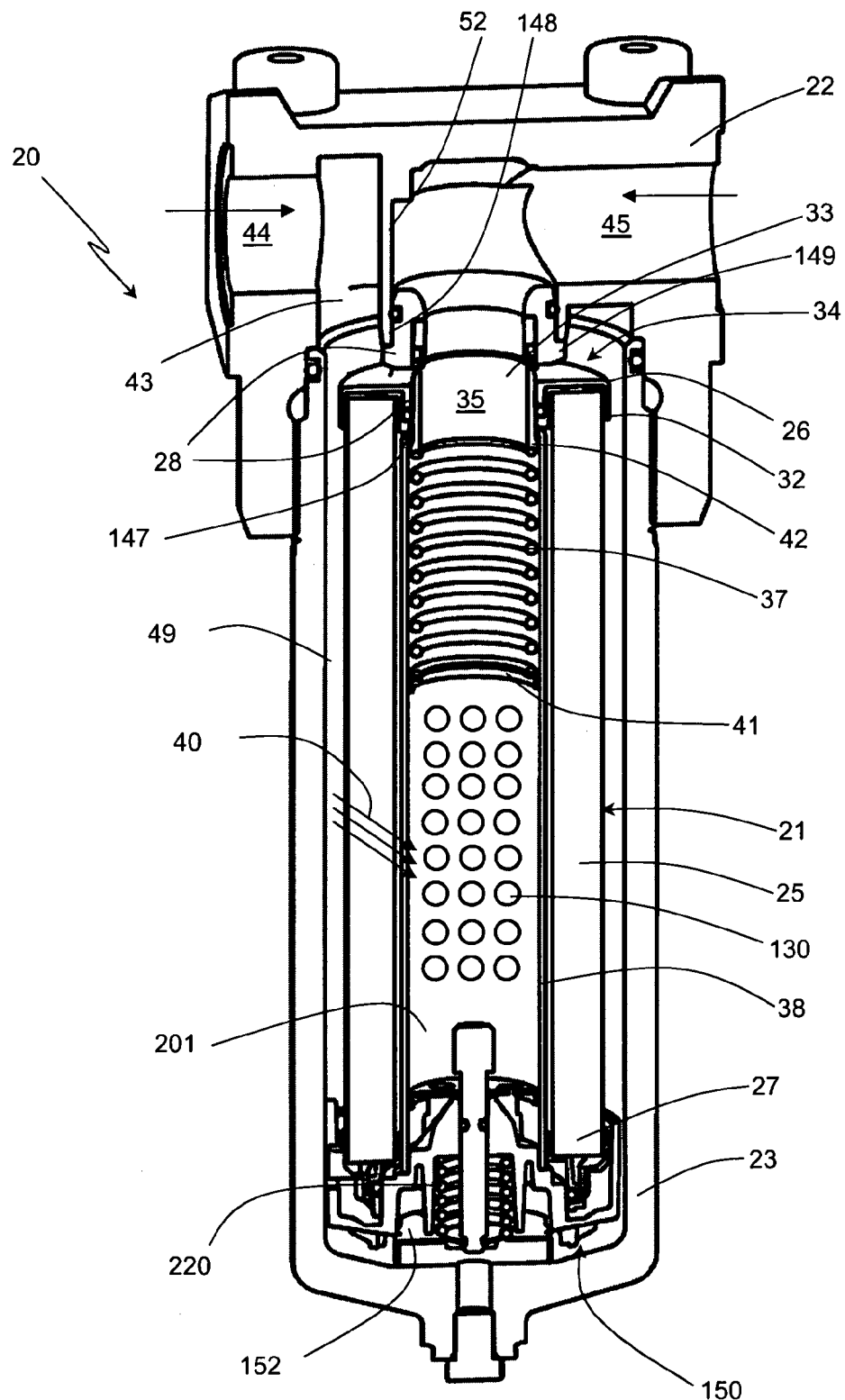
FIG. 1 schematically shows a cross-sectional view of an exemplary filter assembly comprising a combination according to the invention.

Referring to FIG. 1 an example of a filter assembly 20 is provided which filter assembly comprises a combination 10 (see FIG. 4A) of a filter element 21 and a core element 38 according to the present invention. Hereinafter, the invention will be explained by means of such a filter assembly comprising the combination 10 according to the invention. Where reference is made to a filter assembly according to the invention, it is to be understood that a filter assembly comprising the combination according to the invention is envisaged.

A filter assembly according to the invention is generally indicated by reference numeral 20. The filter assembly 20 comprises a filter element 21, a filter housing or body 23 and a filter head 22. The filter housing 23 may also be referred to as a bowl or can.

In a manner which is known per se, the filter housing 23 may be removably attached to the filter head 22 to form an interior or interior chamber arranged to contain the filter element 21. The filter element 21, which is a separate structural unit, generally comprises a tubular wall of filtration medium 25, which tubular wall 25 is further called filtration medium, which filtration medium 25 preferably is the form of a loop of any suitable type. Preferably the filtration medium 25 has a circular cross sectional shape. The filter element 21 comprises a first end part 26 that is provided at a first axial end of the filter element 21. The filter element 21 further comprises a second end part 27 that is provided at a second axial end of the filter element 21. The first and part 26 may also be referred to as the first end cap assembly. Hereinafter the latter wording will be adhered to. The second end part 27 may also be referred to as the second end cap assembly. Hereinafter the latter wording will be adhered to.

The end cap assemblies 26 and 27 preferably are fixedly attached to the ends of the filtration medium 25, such as by bonding with a suitable adhesive, this being a well known technique in the art.

The first end cap 26 comprises a tubular portion 28 which is open at its axial ends and forms with the filter element 21 a first fluid flow passage for the fluid to flow through. The tubular portion 28 comprises a proximal, when viewed from the filtration medium 25, tube part 28a and a distal tube part 28b (see FIG. 4A). The filter assembly 20 further comprises a bypass valve member 35 that allows the fluid to bypass the filter element 21 if circumstances so require. The bypass valve member 35 is tubular and is open at both its axial and distal end.

In the illustrated embodiment, the filter housing 23 is removably attached to the filter head 22 by screwing the body onto the filter head 22. To this end, the filter housing 23 and filter head 22 are provided with threaded portions. The threaded portions are coaxial with the filter housing 23 and filter element 21 which preferably are generally cylindrical in cross-section. The filter housing 23, however, may be removably secured to the filter head 22 by other suitable means, such as by clamps, fasteners, a bayonet closure, etc. Other cross-sectional shapes of the filter element 21 and/or filter housing 23 are also contemplated. The filter head 22 includes inlet and outlet ports 44 and 45 respectively that may have threaded portions for connection to other system components, such as fluid inlet and outlet lines. In most cases, the inlet port 44 will function as an inlet since it communicates with an annular space 49 in the filter housing 23 that is present between the filter element 21 and the inner surface of the filter housing 23 and which defines a first side of the filter element 21. The annular space 49 surrounds the filter element 21. In order to distribute the fluid entering through the inlet port 44 over the annular space 49, the filter head 22 defines an annular passage 31 above and around the first end cap 26.

The configuration as shown in FIG. 1 results in a fluid flow from the inlet port 44 via the annular passage 31 to the annular space 49 and through the filter element 21 or filtration medium 25, i.e. a so-called outside-to-inside flow configuration (also referred to as out-to-in flow). This is indicated in FIG. 1 by means of arrows 40. Consequently, the port 45 will function as an outlet passage for the filter assembly 20. The opposite flow configuration is also contemplated, i.e. the flow configuration wherein the flow is generally in the reversed direction. This will be explained in more detail with reference to FIGS. 5A to 5C.

The bypass valve member 35 is shown in FIG. 1 in a closed or extended position, meaning that the fluid can only flow from the inlet port 44 to the outlet port 45 through the annular space 49 and through the filtration medium 25. The bypass valve member 35 hence is in its normal working position in the example of FIG. 1 and should remain in that position during normal use of the filter assembly 20. In order to achieve this, a resilient member or bypass spring element 37 is provided which exerts a force on the bypass valve member 35 such that the bypass valve member 35 is biased or pretensioned towards its extended position. Preferably the resilient member 37 pretensions the bypass valve member 35 towards the extended position when the bypass valve member 35 is in the extended position, providing a very well controllable opening and closing of the bypass valve member 35.

The filter assembly 20, i.e. the combination 10, comprises a core element 38 which comprises a perforated tube 39 that allows fluid that has passed the filtration medium 25 to enter the internal 201 of the tube 39 and to flow to the internal 33 of the tubular portion 28. In particular the tube 39 comprises a number of through holes 130, which allow the fluid to flow through the perforated tube 39. The bypass valve member 35 is telescopically moveable within and attached to the perforated tube 39 against the bypass spring element 37. Hence, the core element 38 comprising the perforated tube 39 and the bypass valve member 35 is a separate structural unit. The bypass valve member 35 is moveable in an axial direction between an extended position as shown in FIG. 1 and a retracted position as shown with reference to FIG. 4B. Further, as is clearly visible in FIG. 1, the bypass valve member 35 is located in an upper part of the filter housing 23. As the bypass valve member 35 is a tubular member that is open at both its axial ends and due to its position in the core element 38 the fluid flow through the filter assembly 20 will not, in any case hardly, be influenced by the presence of the bypass valve member 35.

The tubular portion 28 defines resp. is provided with a radial flow passage 34 which establishes a flow path or fluid connection between the internal 33 of the tubular portion 28 and an external 43 of the tubular portion 28, which external 43 is especially the annular passage 31. The radial flow passage 34 is provided in the tubular portion 28 between the proximal tube part 28a and the distal tube part 28b (see FIG. 4A). When the bypass valve member 35 is in the retracted position, the radial flow passage 34 is at least partly exposed by the bypass valve member 35 to allow flow in radial direction between the internal 33 of the tubular portion 28 and the external 43 thereof. The radial flow passage 34 might extend essentially all around the tubular portion 28. In order to connect the distal and proximal part of the tubular portion, one or more arms 135 (see FIG. 3C) are provided. Due to the radial orientation of the radial passages, fluid can—when the radial passage 34 is open, i.e. not covered by the bypass valve member 35—flow directly from the inlet port 44 to the outlet port 45, see arrow G in FIG. 3C.

In the extended position of the bypass valve member 35, the bypass valve member 35 radially overlaps the radial flow passage 34, which means that the bypass valve member 35 prohibits radial flow through the radial flow passage 34. In other words, the bypass valve member 35 closes off the radial flow passage 34 due to its moveability in an axial direction. The tubular portion 28 hence acts as a valve seat housing for the bypass valve member 35.

The bypass spring element 37 is in the example of FIG. 1 with its lower end supported by the perforated tube 39 of the core element 38 on a support ridge 41 that is provided on an inner surface of the perforated tube 39. With its upper end the spring element or resilient member 37 abuts against a retention ridge 42 (see also FIG. 2 for more detail).

The core element 38, in particular the perforated tube 39, has transverse outer dimensions that are smaller than the transverse inner dimensions of the filtration medium 25. In the example of FIG. 1 these dimensions are such, that the transverse outer dimensions of the perforated tube 39 mate with the inner dimensions of the filtration medium 25. The perforated tube 39 is positioned inside the filter element 21 and thus can provide mechanical support for the filtration medium 25 of the filter element 21. In other words, the core element 38 is provided downstream of the filtration medium 25, i.e. the low-pressure or clean side of the filter element 21. The term low-pressure is of course only relative and merely serves to indicate that side of the filter element 21 that is in contact with the filtered fluid. In the arrangement as shown, the core element 38 or perforated tube 39 is arranged along an inner surface of the filtration medium 25 which normally has a limited structural strength. By doing so mechanical support to the filtration medium 25 is provided when an out-to-in flow occurs through the filter element 21. As such, the perforated tube 39 substantially prevents the filtration medium 25 from deforming under the pressure difference that exists across it. Without the provision of the perforated tube 39, the filter element 21 could buckle under the pressure difference and the filter assembly 20 would not function properly. The core element 38, i.e. the perforated tube 39 can be a cylindrical tube of stainless steel to provide for the required mechanical strength.

Figure 2:
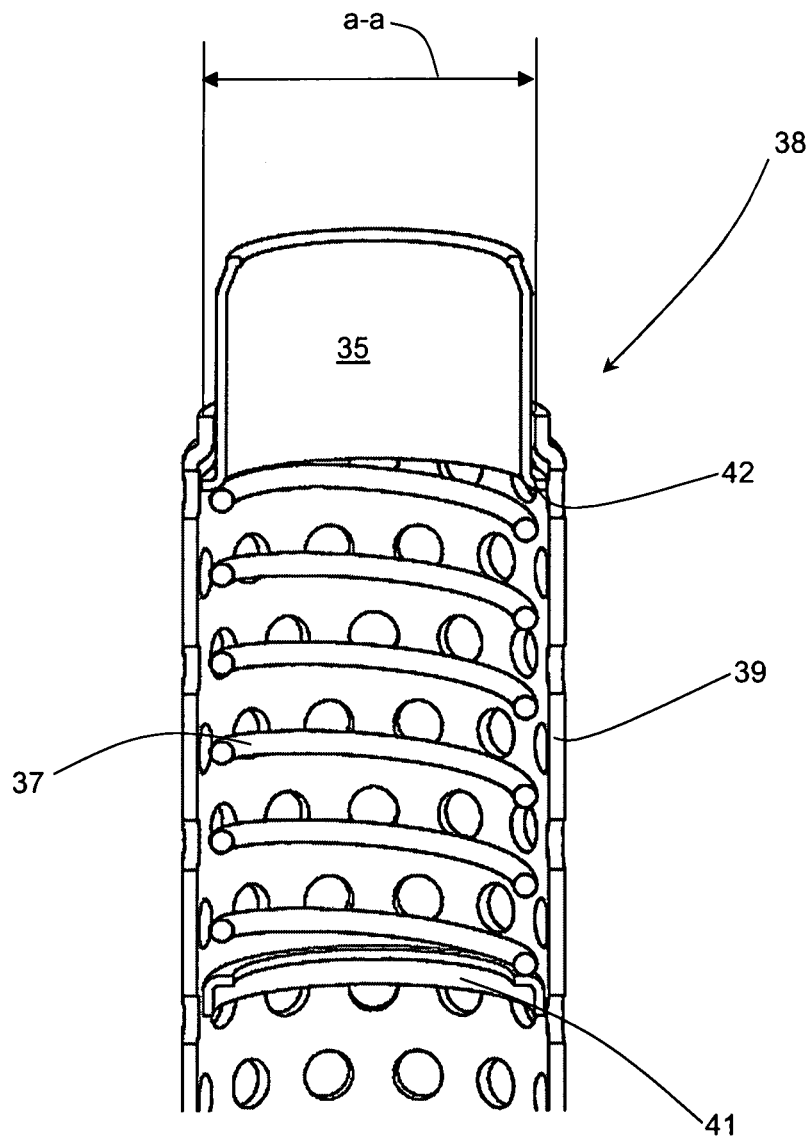
FIG. 2 shows in a sectional view an upper part of a core element with a bypass valve member in an extended position thereof.
Figure 3A:
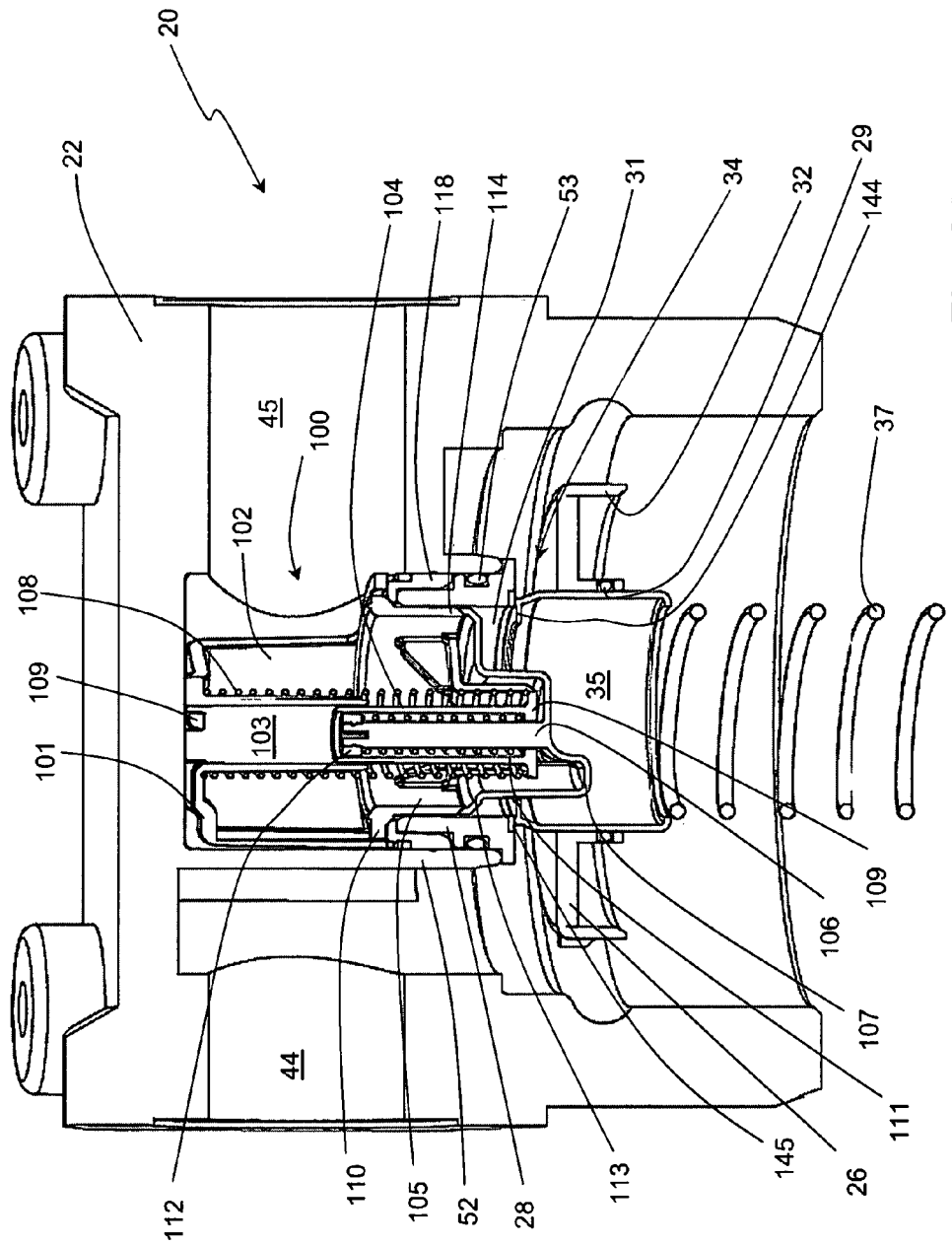
FIG. 3A schematically shows in sectional view a filter head with a valve assembly and bypass valve member in a no-flow-condition.
Figure 3B:
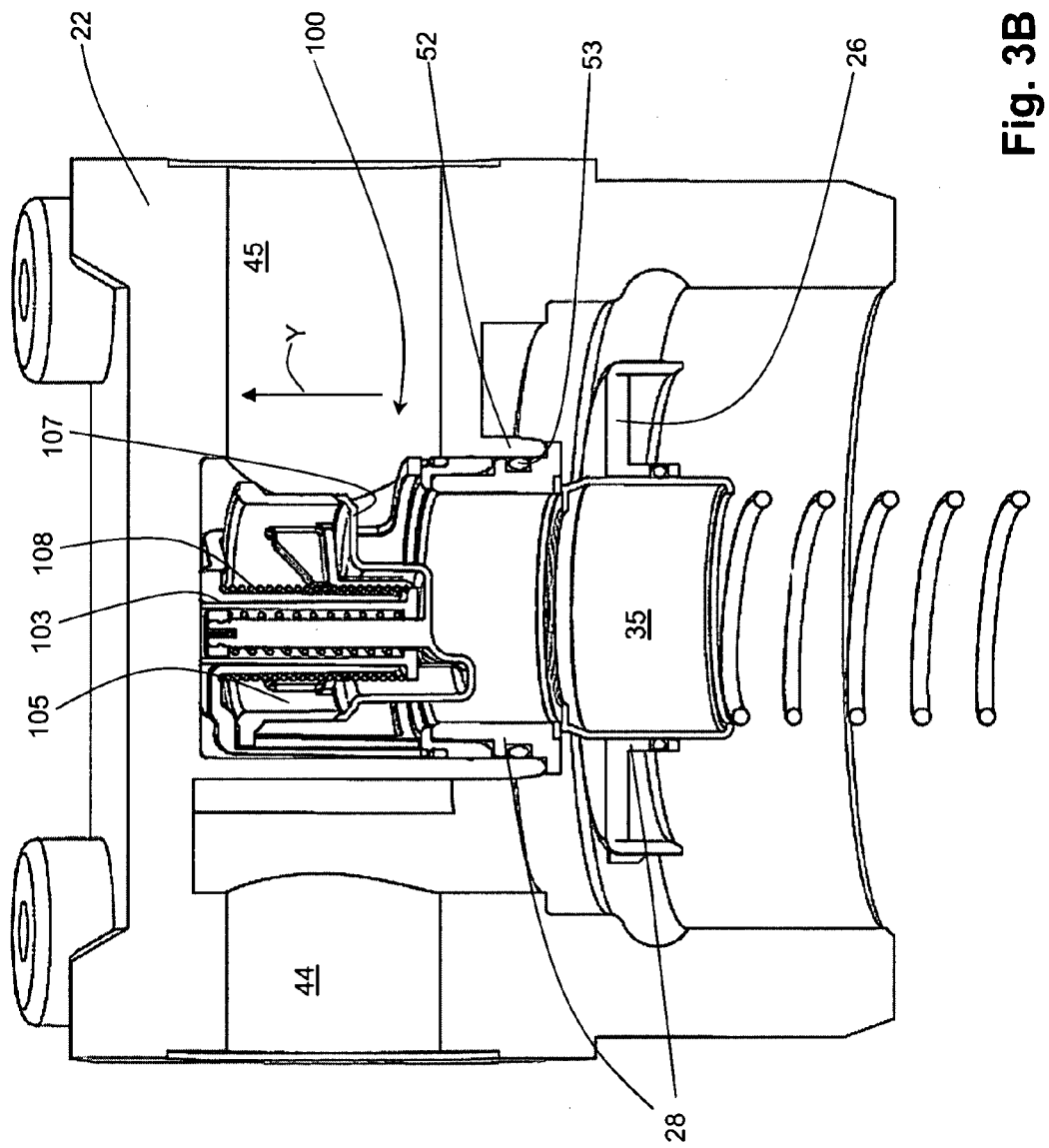
FIG. 3B schematically shows in sectional view the filter head with the valve assembly and bypass valve member in a normal-flow-condition.
Figure 4A:
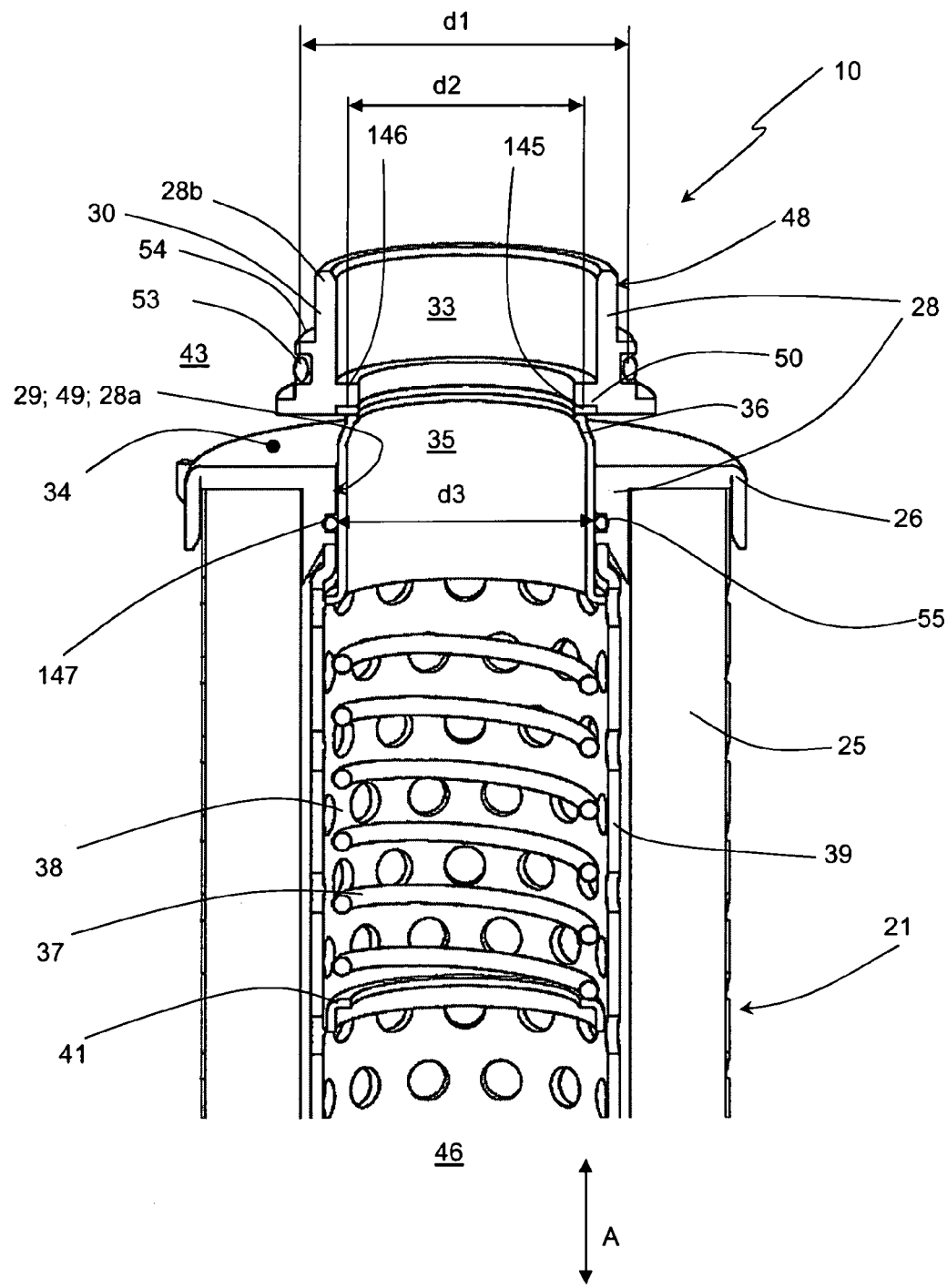
FIG. 4A schematically shows in sectional view part of the filter element with end cap assembly, core element and bypass valve member in a simplified design in a normal flow condition.
Figure 4B:
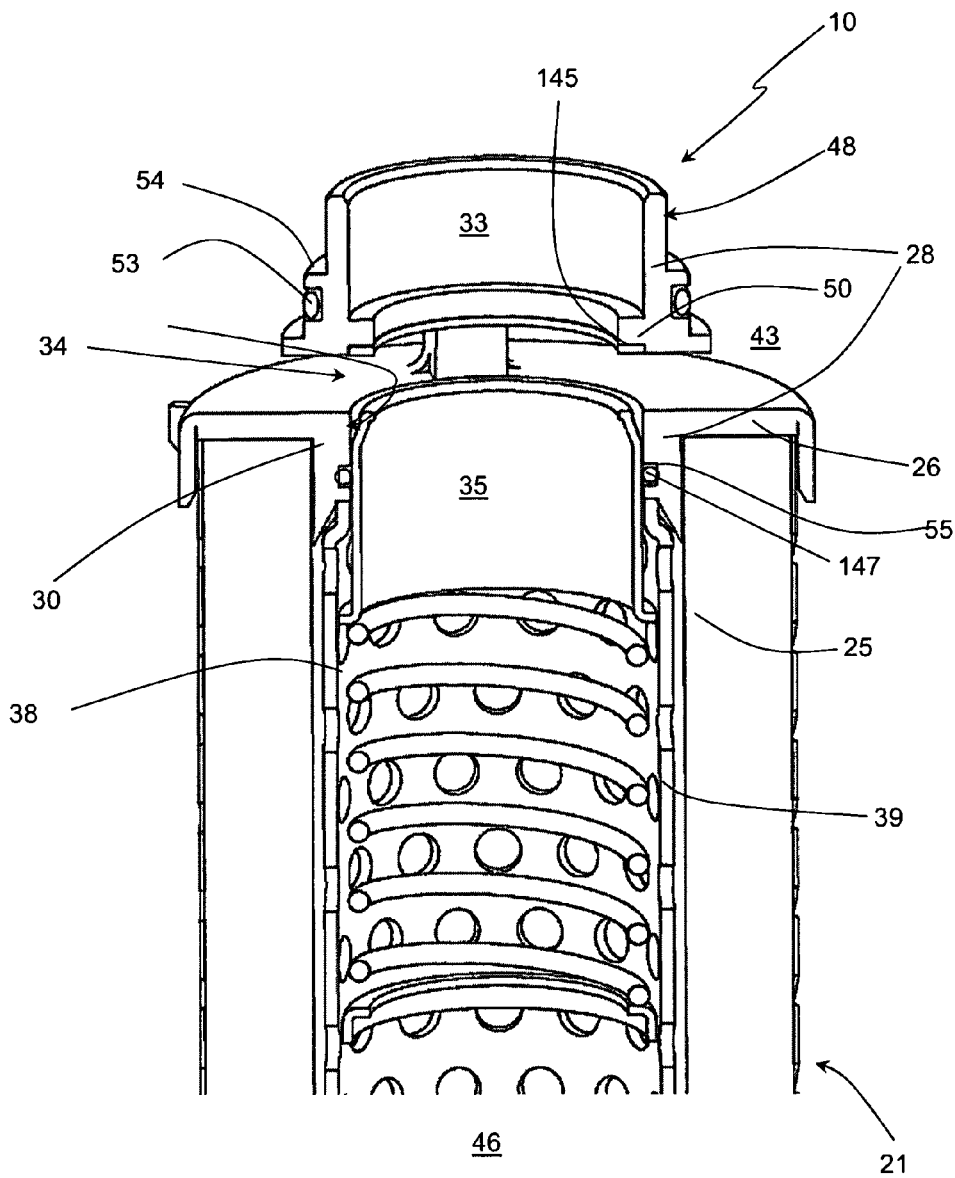
FIG. 4B schematically shows in sectional view part of the filter element with end cap assembly, core element and bypass valve member in a simplified design in a bypass flow condition.

In the FIGS. 3a-3b, the perforated tube 39 of the core element 38 as well as the tubular wall 25 of filtration medium of the filter element are not shown. Neither is shown how the bypass valve member 35 is attached to the perforated tube 39 in axially slidable/telescopically manner. One way of attaching the bypass valve member 35 in axially slidable/telescopically manner to the perforated tube 39, so as to form the core element 38 comprising the bypass valve member 35, is shown in some detail in FIG. 2 (which manner is also shown in FIGS. 4a and 4b) where it can be seen how the bypass valve member 35 is supported by and attached to the perforated tube 39 of the core element 38 between the support ridge 41 and retention ridge 42 of the bypass valve member 35. In the example of FIG. 2, an upward movement of the bypass valve member 35 in the perforated tube 39 due to the resilient force exerted by the bypass spring element 37 is limited because of a narrowing or diameter reduction a-a of the perforated tube 39 of the core element 38 which acts as a stop for the retention ridge 42 prevents the bypass valve member 35 to be pushed out of the perforated tube 39. Other ways of preventing the bypass valve member 35 to be pushed out of the perforated tube 39 are also conceivable, such as the use of a lockring. This is not further detailed here.

In the example of FIG. 1 the filter element 21 is attached with the second end cap assembly 27 to a coupling assembly 150. The coupling assembly 150 carries a coupling part 152, which in turn is fixedly attached or coupled to the bottom part of the filter housing 23. Further, the perforated tube 39 is permanently or releasably attached to the coupling part 152 so that via the coupling part 152 the core element 38 is attached to the housing 23. The perforated tube 39 might be rotatable and/or axially slightly movable with respect to housing 23. Other ways of attaching the core element 38 to the filter housing 23 are also possible, for example by glueing or welding. The benefit of attaching the core element 38, i.e the perforated tube 39 to the filter housing 23 is, that the core element 38 cannot be inadvertently be removed from the filter housing 23 when the filter element 21 is exchanged. Removal of the core element 38 may lead to a person replacing the filter element 21 forgetting to re-install the core element with very detrimental consequences for the filtration medium 25 which may collapse during use.

The first end cap assembly 26 comprises a flange part 32 having a generally U-shaped cross-section and is arranged to accommodate a distal end of the filter element 21, i.e. the filtration medium 25. The distal end of the filtration medium 25 can be permanently attached to the first end cap 26. The first end cap assembly 26 is provided with a number of axially extending support members—earlier called arms—135 (see FIG. 3C). The support members/arms 135 provide the radial flow passage 34 defined in the tubular portion 28.

When the filter assembly 20 is assembled, i.e. the filter element 21 is in place, the tubular portion 28 is pressed against a support edge 148 of an annular wall section 52 of the filter head 22. To achieve this, the tubular portion 28 comprises a rim 149 which extends radially outwards in FIG. 1. Hence, only a filter element being provided with the proper first end cap assembly 26 will fit in the filter assembly 20 and will be able to co-operate with the annular wall section 52 of the filter head 22. The filter element 21 is consequently pressed against the compressive force of the compression spring 220 (see FIG. 1), pre-tensioning the filter element 21 in the filter housing 23.

Referring now to FIG. 3A, the operation of the bypass valve member 35 is described in more detail. In particular FIG. 3A through 3E show a filter assembly 20 comprising a combination of a filter element and a core element 38 according to the invention in combination with an additional valve assembly 100 that may be provided as an optional feature.

The filter head 22 of the filter assembly is shown in a spatial cross-sectional view. The filter element 21 and the filter housing 23 are not shown to improve clarity of the drawing but are present as is indicated by the presence of the first end cap 26 in the drawing. In the filter head 22 a valve assembly 100 is provided which is mainly seated in an annular passage 31 provided in the filter head 22. The annular passage 31 is located between the inlet port 44 and the outlet port 45 and accommodates the upper part of the first end cap assembly 26. The annular passage 31 is defined by the annular wall section 52. Between the annular wall section 52 and the filter head 22 a third annular seal member 53 is provided, which may be an O-ring for example. In particular the seal member 53 provides a sealing between the annular wall section 52 and the tubular portion 28 of first end cap assembly 26 (see also FIG. 3B). In other words, the third seal member 53 is an external seal for sealing engagement in an aperture of a filter device, which third seal member 53 is provided distally from the radial flow passage 34.

The valve assembly 100 is operable between the annular passage 31 and the outlet port 45 and is arranged to open and close the annular passage 31, i.e. arranged to open and close the outlet 45. In particular the valve assembly 100 can close the outlet 45 when the filter housing 23 is removed from the filter head 22 by blocking flow from the outlet port 45 towards the annular passage 31 and consequently out of the filter head 22.

The valve assembly 100 comprises a valve housing 101. The valve housing 101 is tubular in design and has a radial flow passage 102 which is open towards the outlet port 45. The radial flow passage 102 spans about a quarter to about half of the circumference of the valve housing 101 to allow the fluid to flow through the valve assembly 100 and towards the outlet port 45 with as low a flow resistance as possible. The valve housing 101 comprises a tubular guide 103 for telescopically guiding a stem 104 of a first valve element 105.

The stem 104 in turn is a tubular element which telescopically guides a second stem 106 of a second valve element 107. Hence, the first valve element 105 and the second valve element 107 are axially movable with respect to each other.

Figure 3C:
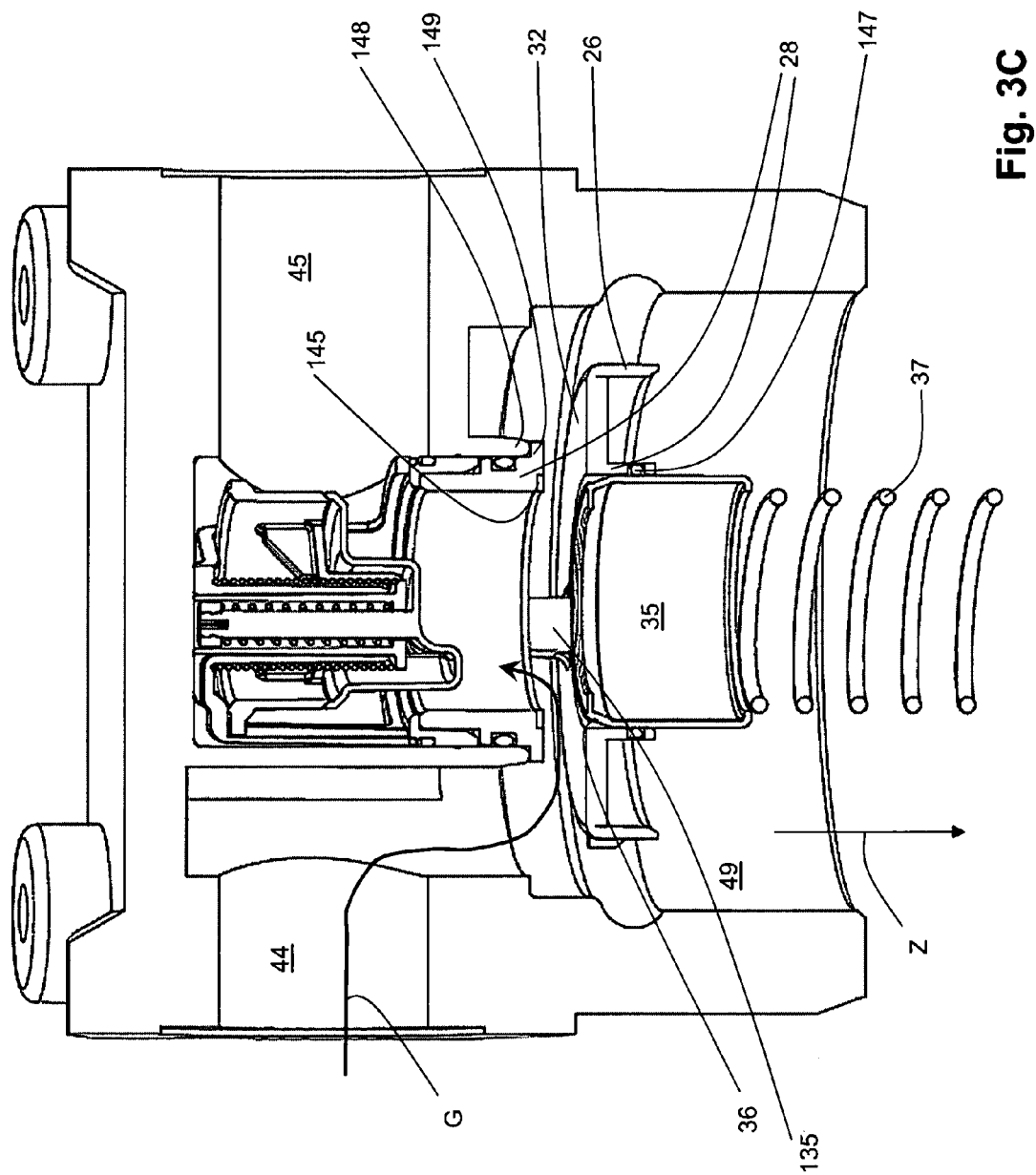
FIG. 3C schematically shows in sectional view the filter head with the valve assembly and bypass valve member in a bypass-flow-condition.
Figure 3D:
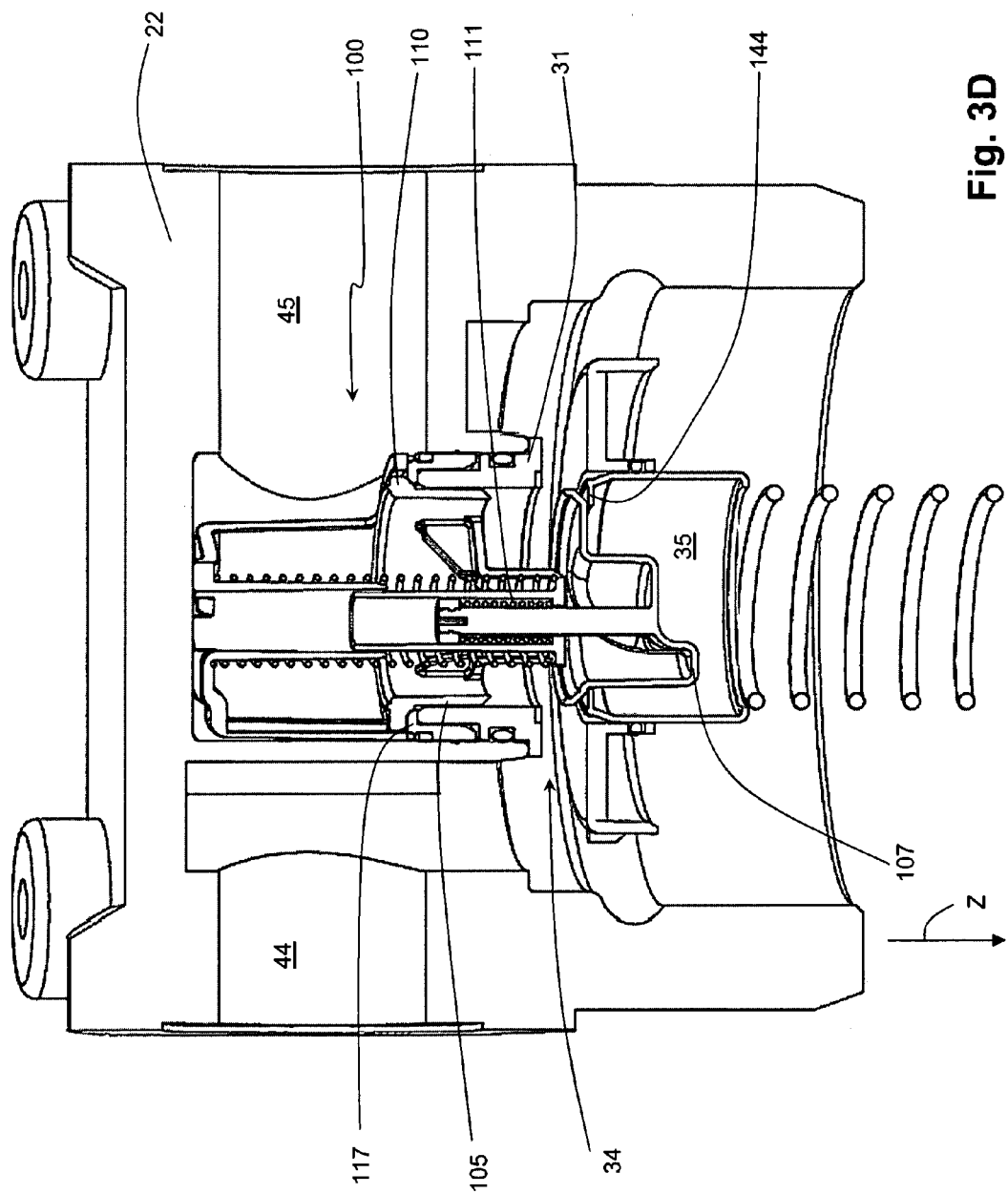
FIG. 3D schematically shows in sectional view the filter head with the valve assembly and bypass valve member in a reverse-flow-condition.
Figure 3E:
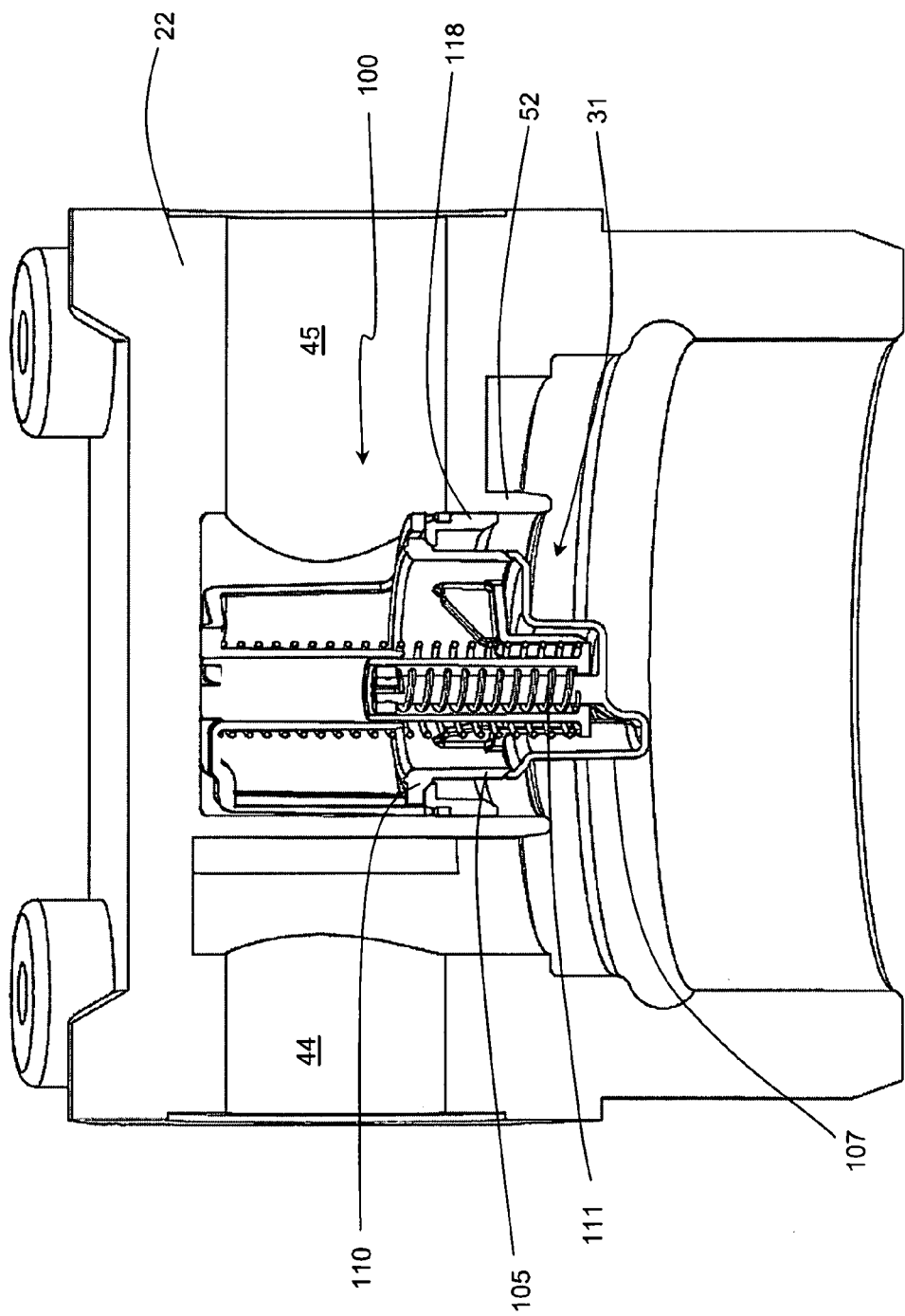
FIG. 3E schematically shows in sectional view the filter head with the valve assembly and bypass valve member in a no-element-condition.

Between the valve housing 101 and the first valve element 105 and located around the tubular guide 103, a first compression spring 108 is provided which rests on a flange 109 of the first valve element 105, thus biasing the first valve element 105 downwards in FIG. 3A such that an upper annular rim 110 of the first valve element 105 seats on an annular seal ring 118 (see also FIG. 3E). As can be seen in FIG. 3A, the second stem 106 of the second valve element 107 is located inside the tubular stem 104 of the first valve element 105 and a second compression spring 111 is provided between an end part 112 of the second stem 106 and an inner portion of the flange 109. The second compression spring 111 biases the second valve element 107 upwards in FIG. 3A such that a rim 113 of the second valve element 107 seats against a lower edge 114 of the first valve element 105.

The first valve element 105 and the second valve element 107 substantially form a single valve in the situation shown in FIG. 3A because of the force exerted by the second compression spring 111.

In the situation shown in FIG. 3A, the rim 113 of the second valve element 107 seats against the lower edge of the first valve element 105 and consequently the annular passage 31 is closed and no fluid can flow through the valve assembly 100 in either direction. Furthermore, the bypass valve member 35 is in its closed or first position, closing the radial flow passage 34. The upper rim 144 of the bypass valve member 35 seats against a second annular seal member 145. An alternative embodiment of a solution for sealing the bypass valve member 35 against the tubular portion 28 is discussed with reference to FIGS. 4C and 4D. The second seal member 145 can be made from an elastomeric material or any other suitable material. The position of the valve element 100 and the bypass valve member 35 of FIG. 3A is denoted as no-flow-condition.

During normal use of the filter element, denoted as normal-flow-condition, the fluid to be filtered will flow through the filter element (out-to-in flow) and through the valve assembly 100 towards the outlet port 45. This situation is shown in FIG. 3B.

In comparison with the no-flow-condition of FIG. 3A, the first valve element 105 and the second valve element 107 have moved upward in FIG. 3B (indicated with arrow Y) as a single valve under the influence of an increased fluid pressure, wherein said increased fluid pressure must be large enough to overcome the force exerted by the first compression spring 108. In the normal-flow-condition of FIG. 3B, the fluid will flow along the closed bypass valve member 35 and along a profiled flow guide surface 116 of the second valve element 107 towards the outlet port 45.

When the first valve element 105 and the second valve element 107 move upwards as indicated in FIG. 3B, fluid that will be present in the tubular guide 103, which is open at its distal end, can be pushed out via said open distal end by the provision of a radially extending flow channel 119 (see FIG. 3A), providing a damping function of the valve assembly 100.

As explained with reference to FIG. 1, in certain circumstances it is required that the fluid flow bypasses the filter element. This situation is denoted as bypass-flow-condition and is shown in FIG. 3C.

In comparison with the normal-flow-condition shown in FIG. 3B, the bypass valve member 35 has been moved in a downward direction in FIG. 3C (indicated with arrow Z) due to an increased pressure outside of the first end cap assembly 26 and against the bias force of bypass spring element 37. The fluid is now able to bypass the filter element as is indicated with arrow G. It is noted here, that the length of the bypass spring element 37 can be adjusted by changing the position of the retention ridge 41 in the core element 38 (see FIG. 1). By increasing the length of the bypass spring element 37, the hysteresis of the bypass spring element 37 can be reduced and a better and more accurate control of the opening and closing of the bypass valve member 35 can be achieved.

In certain exceptional circumstances a flow condition denoted as reverse-flow-condition can be present in the filter assembly according to the invention. This reverse-flow-condition is shown in FIG. 3D. In this situation the fluid flows from the outlet port 45 towards the inlet port 44 and should do so without flowing through the filter element. The latter is highly unwanted as this would remove the filtered material or debris from the filter element. In the reverse-flow-condition the radial flow passage 34 must hence be open, but the fluid must not be able to reach the interior of the filter element.

To achieve this, the increased pressure in the outlet port 45 will move the first valve element 105 and the second valve element 107 in a downward direction (indicated with arrow Z). Downward movement of the first valve element 105 is limited by a stop member 117 on which the upper rim 110 of the first valve element 105 seats. The lower part of the first valve element 105 is designed as a spider case and comprises axial flow passages that allow fluid to flow through the lower part of the first valve element 105. Hence, in the reverse-flow-condition the increased fluid pressure will push against the second valve element 107 such that it is also moved in a downward direction against the force exerted by the second compression spring 111. In its downward movement, the second valve element 107 will push the bypass valve member 35 via its upper rim 144 downward also, opening the radial flow passage 34 while at the same time blocking flow through the annular passage 31.

As has been explained above, the filter element 21 needs to be periodically replaced and the filter head 22 and filter housing 23 can be separated. To avoid unwanted spilling of fluid when separating the filter housing 23 and the filter head 22 when the filter element 21 needs to be replaced the valve assembly 100 is arranged to close the annular passage 31 such that any fluid remaining in the filter head 22 and/or in a conduit attached to the outlet port 45 is blocked from flowing out of the filter head 22. Hence, separating the filter housing 23 from the filter head 22 can be done without the risk of spilling fluid which is present downstream of the filter assembly 20. The condition in which the filter housing 23 and with it the filter element 21 has been separated from the filter head 22 is denoted as no-element-condition and is shown in FIG. 3E.

The no-element-condition is shown in FIG. 3E, which condition mainly corresponds to the no-flow-condition as explained with reference to FIG. 3A except that the first end cap assembly 26 is no longer present, because the filter element has been removed and the filter housing is not attached to the filter head 22.

As shown in FIG. 3E connection between the outlet port 45 and the annular passage 31 is closed as the first valve element 105 and the second valve element 107 form a single or unitary valve under the influence of compression spring 111, i.e. the second valve element 107 is pulled against the first valve element 105 by the action of the compression spring 111. The actual closing of the fluid connection between the outlet port 45 and the annular passage 31 is achieved by pushing the upper rim 110 of the first valve element 105 by means of the compression spring 108 onto the annular seal ring 118 which is fixedly mounted to the wall section 52.

It is noted here that the present invention also can be combined, i.e. work together with a simplified valve assembly 100, i.e. a valve assembly that does not provide for the no-element-condition as shown in FIG. 3E, but wherein only the second valve element 107 is present and the first valve element 105 is not. Hence, such a valve assembly is able to allow the reverse-flow-condition of FIG. 3D. Similarly, it is also conceivable that the valve assembly 100 only has the functionality of closing the outlet 45 when no filter element is accommodated in the filter housing.

It is further noted here, also with reference to FIG. 1, that the core element 38 is supported by the bottom part of the filter housing 23, wherein the resilient member 37 is pre-tensioned between the bypass valve member 35 and the core element 38 when the filter housing 23 is attached to the filter head 22 when the filter element 21 is positioned in the filter housing 23. By pre-tensioning the resilient member 37 or spring element the functioning of the bypass valve member 35, in particular its opening and closing, becomes better controllable. The pretensioning further improves the seal between the upper rim 144 of the bypass valve member 35 and the axially facing sealing seat 145 of the second seal member 146, when the bypass valve member 35 is in the extended position.

As explained with reference to FIG. 1, the bypass valve member 35 is arranged to be axially or telescopically movable within the perforated tube 39 of the core element 38 and is also telescopically moveable in a tubular portion 28—acting as a valve seat housing for the bypass valve member 35—of the first end cap assembly 26 between the extended or closed position blocking flow through the radial flow passage 34 as is depicted in FIG. 3A and a retracted position allowing flow through the radial flow passage 34 as is depicted in FIG. 3C. Between the bypass valve member 35 and the tubular portion 28 a first annular seal member 147 in the form of an O-ring is provided. Other radial sealing solutions are also conceivable, such as a lipseal or the like. The material the bypass valve member 35 is preferably made of is a wear-resistant material, in particular a metal and more in particular steel. This allows a better seal to be achieved between the tubular portion 28 and the bypass valve member 35 in comparison with some prior art bypass valves that are integrated in the end cap assembly and are made of the same plastic material as the end cap assembly.

In the retracted position of the bypass valve member 35 part or all of the fluid flowing through the filter assembly will be able to bypass the filter element 21. Such situations may arise when the filter media is clogged with material that has to be filtered out of the fluid and consequently that the pressure drop over the filter element becomes too great. In such a situation the pressure outside the first end cap assembly 26 increases, or at least the pressure difference between the interior of the first end cap assembly 26 (and thus the interior of the filter element) increases, and the pressure will urge the bypass valve member 35 in a downward direction Z. To achieve this, the bypass valve member 35 comprises a pressure ridge 36 which is exposed to the fluid pressure in the inlet port 44 (the external 43 of the tubular portion 28) or upstream of the filter element 21. The pressure ridge 36 may also have a different shape than the one shown in FIG. 3C. The pressure ridge 36 is designed as a reduction in diameter of the tubular bypass valve member 35, which gives rise to a difference between the diameter of the second seal member 145 and the diameter of the first seal member 147, the diameter of the seal member 145 being smaller than the diameter of the seal 147. Hence, in the configuration of FIG. 3C which configuration corresponds with the above-described out-to-in flow configuration, an area must be provided exposed to the high pressure side of the filter element 21 (external 43 of the tubular portion 28). The pressure ridge 36 faces in the direction of the extended position to press the bypass valve member 35 towards the retracted position under the influence of the pressure exerted by the fluid on the pressure ridge. The ridge 36 thus provides for actuation of the bypass valve member 35. The bypass valve member 35 may according to the invention also be actuated in a different manner, for example by means of electric actuation, like a solenoid.

It is noted that the configuration of the bypass valve member 35 shown in FIGS. 1-4, is used when the filter assembly 20 is used in the earlier mentioned out-to-in flow, i.e. the fluid flows from the inlet port 44 through the annular passage 31, through the annular space 49, through the filter element 21 and the core element 38 (the perforated tube 39), through the axial passage 29 in the first end part 26 and out of the filter head 22 through the outlet port 45. However, it is also possible that the filter assembly works according to the in-to-out principle in which the fluid substantially flows in an opposite direction. This will be explained with reference to FIGS. 5A and 5B.

In the above examples the bypass valve member 35 is supported by the perforated tube 39 of the core element 38. In particular it has been shown in the above examples that the bypass valve member 35 is arranged such, that it is moveably attached to the perforated tube 39 and is partly housed inside the perforated tube 39 between the open distal end thereof and the support ridge 41, wherein the bypass spring element 37 pretensions the bypass valve member 35 towards the extended position thereof. Furthermore, it has been shown and described that the bypass valve member 35 co-operates with the first end cap assembly 26 as it seals against the first seal member 147 and second seal member 145, which are both provided in the tubular portion 28, which tubular portion 28 acts as a valve seat housing for the bypass valve member 35. Furthermore, as explained with respect to FIG. 1 the core element 38, i.e. the perforated tube 39, can be fixedly attached to the filter housing 23. This means that the core element 38 is not an element that needs replacement. In turn this means that also the bypass valve member 35, which is attached to the perforated tube 39, is not an element that will need replacement when the filter element is replaced. This enables to provide a much simpler first end cap assembly 26 as it is not required to provide said end cap assembly with a bypass valve. Hence, this is more environmentally friendly as less waste is produced, which waste may be contaminated with hydraulic fluid. Furthermore, the bypass valve member 35 according to the present invention can now advantageously be made from the same material as the perforated tube 39, for example steel. However, other metals are also possible such as aluminium. This greatly improves the structural strength of the bypass valve member 35 and improves its lifespan. Furthermore, this provides for a, relatively, hard surface against which the first seal member 147 and second seal member 145 can seal. This is in particularly an improvement over known bypass flow valve arrangements which are an integral part of the end cap assembly 26 and are made of the same plastic material as the end cap assembly. It is noted however, that for the operation of the bypass valve member 35 it is according to the invention not essential that the core element 38 is fixedly coupled to the filter housing 23.

The valve assembly 100 of the embodiment of FIGS. 3a-3e is arranged on top of the bypass valve member 35 and has a leakage prevention function to prevent leakage when the filter element is replaced and a reverse flow function to allow reverse flow in case the pressure in the outlet port 45 exceeds the pressure in the inlet port 44 in order to prevent material collected in the tubular filter wall 25 from being blown out. As will be clear from the foregoing description of the embodiment of FIGS. 3a-3e as well as from FIG. 1, the bypass valve member 35 can also function without the valve assembly 100. Only the leakage prevention function and the reverse flow function will be lost—but might be achieved in different manner if desired—. FIGS. 4a and 4b show a combination (of filter element and core element) according to the invention without showing a filter head and filter housing. Thus, the presence of the valve assembly 100 is according to the invention not essential for the bypass valve member 35.

In FIG. 4A the filter element 21 with the first end cap assembly 26 is shown. The first end cap assembly 26 with the tubular portion 28 surrounds the bypass valve member 35 as described heretofore, wherein the bypass valve member 35 is in its closed or extended position and is sealed against the second seal member 145 with its end section that is distal from the perforated tube 39. Also it can be seen how the first seal member 147 seals against the outer surface of the bypass valve member 35, preventing contaminated fluid to reach the clean side of the filtration medium 25. FIG. 4B shows the bypass valve member 35 in its open or refracted position clearly showing that the radial flow passage 34 is exposed by the bypass valve member 35 and leaving it open for fluid to flow directly from the external 43 to the internal 33 of the tubular portion 28 in a radial direction.

More detailed it can be noted with respect to FIGS. 4A and 4B, that the filter element 21 according to the present invention, i.e. the filter element as such, comprises the tubular wall 25 of filtration medium for collecting material entrained in a fluid stream passing through the tubular wall 25, and the first end part or end cap assembly 26 that is provided at a first axial end of the filter element 21. The first end part 26 comprises the tubular portion 28 that defines the axial flow passage 29 through the tubular portion 28. The axial flow passage 29 can be seen to be open—at its lower side in FIG. 4—in axial direction towards an internal 46 of the tubular wall 25 and is open—at its upper side in FIG. 4—in axial direction towards the external 43 of the tubular portion 28. The tubular portion 28 is provided with the radial flow passage 34 that is open in radial direction to allow fluid connection in radial direction between the external 43 of the tubular portion 28 and the internal 33 of the tubular portion when the bypass valve member 35 is in the retracted (open) position. Further a third seal member 53 is provided on an outer surface 48 of the tubular portion 28 adjacent the radial flow passage 29 on a first side thereof that is distal from the tubular wall 25, and the second seal member 147 is provided in the axial flow passage 29 on the inner surface 49 of the tubular portion 28 adjacent the radial flow passage 29 on a second side thereof that is proximal to the tubular wall 25.

In particular the third seal member 53 has a first diameter d1 and the second seal member 145 has a second diameter d2, the first diameter d1 being larger than the second diameter d2. This is however not essential. Furthermore, the tubular portion 28 is provided with the first seal member 147 having a diameter d3 which is larger than the diameter d2 of the second seal member and smaller than the diameter d1 of the third seal member. It is however not essential that diameter d1 is larger than diameter d3.

On the seal ridge 146, in particular on a surface 50 thereof that faces the internal 46 of the tubular wall 25 of filtration medium, the second seal member 145 is provided in the axial flow passage 29 of the tubular portion 28, on the inner surface 49 of the tubular portion 28 adjacent the radial flow passage 29 on the first side thereof that is distal to the tubular wall 25.

The second seal member 145 has a diameter d2 that is smaller than the diameter d3 of the first seal member 147. Preferably the material of the third seal member 145 is different from the material of the ring-shaped seal ridge 146.

In FIG. 4C and in more detail in FIG. 4D the filter assembly 21 with filter element 25 (only partly shown) is shown, which filter assembly comprises an alternative sealing arrangement between the bypass valve member 35 and the end cap assembly 26 is shown. FIG. 4D shows detail C indicated in FIG. 4C in more detail.

More in particular an alternative is shown wherein the combination of the axially facing sealing seat 145 and the second seal member 146 is modified. In the example of FIGS. 4C and 4D, it is shown that the end cap assembly 26 having the tubular portion 28 is provided with an axially facing seal part 145a that acts as a sealing seat. The seal part 145a preferably has a sloping surface that tapers in an inward direction. However, the surface of the seal part 145a may also be differently designed. In the example of FIG. 4C, 4D the second seal member 146 (see FIG. 4A) is omitted. Instead, and in order to still ensure a proper seal between the bypass valve member 35 and the tubular portion 28 of the end cap assembly 26 when the bypass valve member 35 is in its closed position, the bypass valve member 35 is provided with a sharp-edged rim 500 on its axial end that extends in axial direction and in the closed or extended position of the bypass valve member 35 abuts against the seal part 145a. Preferably the sharp-edged rim 500 has significantly smaller dimensions, e.g. a smaller surface area, than the axial end of the bypass valve member 35. In a preferred embodiment the bypass valve member 35 is made of a metal, e.g. stainless steel, and the end cap assembly 26 is made of a plastic material. Hence, the material of the bypass valve member 35 has a larger hardness than the material of the end cap assembly 26. In the closed position if the bypass valve member 35, the sharp-edged rim 500 will be, at least partly, pressed into the softer material of the end cap assembly 26 by the resilient member 37, thus providing a proper seal.

Another alternative solution for the seal between the bypass valve member 35 and the end cap assembly 26 would be to provide the bypass valve member 35 with the second seal member 146, i.e. to provide the axial end of the bypass valve member 35 with an annular seal member, such as an O-ring, for example. This is not further shown in the drawing, but this will be clear for a person skilled in the art.

Further it can be seen that both the third seal member 53 and the first seal member 147 are in a circumferential groove 54 on the outer surface 48 of the tubular portion 28 and a circumferential groove 55 on the inner surface 49 of the tubular portion 28, respectively.

It is noted here that all seals, i.e. the third seal member 53, the first seal member 147 and the second seal member 145 are provided in the end cap assembly 26 of the filter element 21. This means that when the filter element 21 is replaced, also all said seals are replaced with it and that upon placement of a fresh filter element all these seals are replaced by new ones. This ensures that with every replacement of a filter element the seals are replaced with it, avoiding the risk of leaving old seals in place which may fail because of wear.

In the above discussed examples of the filter assembly according to the present invention the filter assembly is operated under the so-called out-to-in flow regime. However, the opposite flow regime, i.e. in-to-out flow, wherein the direction of flow of the fluid through the filter assembly is directed in an outward direction is discussed with reference to FIGS. 5A to 5C.

FIG. 5A shows a filter assembly 20' which is very similar to the filter assembly as shown in FIG. 1 and is the same as or at least similar to the filter assembly 20 of FIG. 1 apart for the following differences.

Figure 5C:
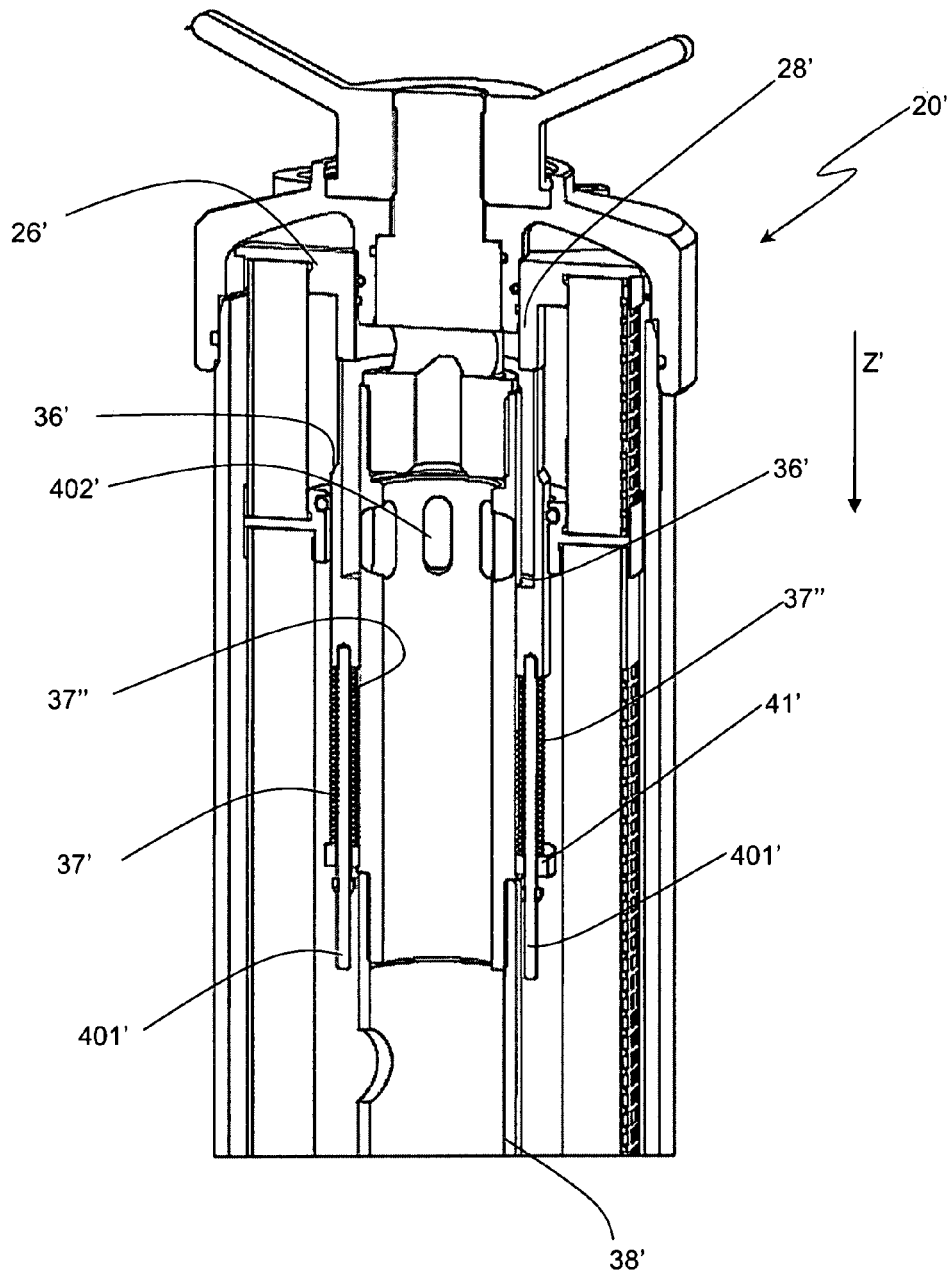
FIG. 5A schematically shows a cross-sectional view of a further exemplary filter assembly according to the invention.
FIG. 5B schematically shows a cross-sectional view of a detail of FIG. 5A with a bypass valve member in an open position, and FIG. 5C schematically shows a cross-sectional view of a detail of FIG. 5A with a bypass valve member in a closed position.

The filter assembly 20' comprises a filter head 22' having an inlet 44' and an outlet 45', a filter housing 23' a filter element 21', a perforated core element 38', i.e. a core element 38' having a perforated tube 39', and first and second end cap assemblies 26' and 27'. The first end cap assembly 26' is provided with a tubular portion 28'. Further, the filter assembly 20' comprises a bypass valve member 35'. In the example of FIGS. 5A and 5B the bypass valve member 35' is in its open or retracted position. The normal flow direction, the bypass valve member 35' being in its extended position as is shown in FIG. 5C, is indicated by means of arrows E, F and H in FIG. 5A. The area within rectangle A in FIG. 5A is shown in more detail in FIGS. 5B and 5C.

FIG. 5C shows the filter assembly 20' of FIG. 5A, in which the bypass valve member 35' is in its closed or extended position radially closing or overlapping the radial flow passage 34' in the tubular portion 28'. The bypass valve member 35' is again of a tubular design and is open at both its axial ends. Between the perforated tube 39' of the core element 38' and the bypass valve member 35' a resilient member 37' is provided. The resilient member 37', in the example of FIGS. 5A-5C, comprises multiple helically wound springs 37", e.g. compression springs, which are guided along guide rods 401 protruding through a retention rim 41' that is attached to the perforated tube 39'. The resilient member 37' urges the bypass valve member 35' in an upward direction and against the tubular portion 28' thus creating a seal between the end cap assembly 26' and the bypass valve member 35' in a manner similar to what has been described heretofore with respect to FIGS. 1 to 4B. The core element 38' comprises additional through openings 402 which allow the fluid to be filtered and therewith the pressure thereof to reach a pressure ridge 36'. The through openings 402 are provided for bypass flow only. During normal flow conditions the fluid will flow through openings 130' provided in the perforated tube 39'. When the pressure difference between the pressure that is exerted on the pressure ridge 36' and on the further pressure ridge 36" that is located on the low-pressure side of the bypass valve member 35' exceeds a predetermined value, the bypass valve member 35' is pushed downward in a direction Z' against the pretensioning force of the resilient member 37', such that the bypass valve member 35' is positioned in the retracted position of FIG. 5B. As can be seen in the drawing, both pressure ridges 36' and 36" face in the direction of the extended position of the bypass valve member 35. As seen in the direction of the fluid flow, the pressure ridge 36' which is exposed to the high pressure or upstream part of the filtration medium 25', is formed by a diameter enlargement of the bypass valve member 35'.

In FIG. 5B the bypass valve member 35' is displaced in the direction of arrow Z' against the force of resilient member 37' thus opening a radial flow passage 34'. This allows the fluid to flow through an additional filtration medium 403 that is made of a meshed or open structured material that has a much lower flow resistance than the filtration medium 25', so fluid can reach the annular space 49' and consequently bypass the filtration medium 25'. This is indicated with arrow K. The provision of the additional filtration medium 403 is not an essential feature.

The embodiment shown in FIGS. 5A-5C also provides the provision of a bypass valve that is moveably attached to the perforated tube of a core element and consequently has the same advantages as the embodiments shown in the previous FIGS. 1-4B.

An alternative way of defining the present invention is provided in the following set of numbered clauses:

1. A filter assembly (20) comprising a filter element (21), a filter housing (23) for accommodating the filter element (21), an end cap assembly (26) at a first end of said filter element (21), the end cap assembly (26) comprising a tubular portion (28), wherein the tubular portion (28) defining a radial flow passage (34) for allowing fluid to bypass the filter element (21), a bypass flow valve (35) movable between a first position blocking flow through said radial flow passage (34) and a second position allowing flow through said radial flow passage (34), and a perforated core element (38), wherein the bypass flow valve (35) is a tubular member open at both axial ends, said bypass flow valve (35) is moveably attached to the core element (38).

2. Filter assembly (20) according to clause 1, wherein the bypass flow valve (35) in its first position seals against the tubular portion (28).

3. Filter assembly (20) according to clause 1 or 2, wherein the bypass flow valve (35) is biased to its first position by a resilient member (37).

4. Filter assembly (20) according to clause 3, wherein the resilient member (37) is a spring, in particular a compression spring that is operable between the core element (38) and the bypass flow valve (35).

5. Filter assembly (20) according to clause 4, wherein the resilient member (37) is supported by the core element (38).

6. Filter assembly (20) according to any of the previous clauses, wherein the bypass flow valve (35) is axially moveable along at least part of the core element (38).

7. Filter assembly (20) according to clause 6, wherein the bypass flow valve (35) is moveable along an inner surface of the core element (38).

8. Filter assembly (20) according to clause 6, wherein the bypass flow valve (35) is moveable along an outer surface of the core element (38).

9. Filter assembly (20) according to any of the previous clauses wherein the bypass flow valve (35) is made from a wear-resistant material, in particular a metal, more in particular steel.

10. Filter assembly (20) according to any of the clauses 3 to 9, further comprising a filter head (22) to which the filter housing (23) is detachably attachable and wherein the filter element (21) is fixedly positioned between an annular wall section (52) of the filter head (22) contacting the end cap assembly (26) and a coupling assembly (150) provided in a bottom part of the filter housing (23).

11. Filter assembly (20) according to clause 10, wherein the core element (38) is supported by the bottom part of the filter housing (23) and wherein the resilient member (37) is pre-tensioned between the tubular portion (28) and the core element (38) when the filter housing (23) is attached to the filter head (22) and the filter element (21) is positioned in the filter housing (23).

12. Filter assembly (20) according to clause 11, wherein the coupling assembly (150) is fixedly coupled to the filter housing (23) and is arranged to fixedly couple the core element (38) to the filter housing (23).

13. Filter assembly (20) according to any of clauses 10 to 12, wherein the coupling assembly (150) is arranged to detachably couple the filter element (21) to the filter housing (23).

14. Filter assembly according to any of the previous clauses, wherein the bypass flow valve (35) is located in an upper part of the filter assembly (20)

15. Filter element (21) comprising:
a tubular wall (25) of filtration medium for collecting material entrained in a fluid stream passing through the tubular wall (25);
a first end part (26) provided at a first axial end of the filter element (38);
a second end part (27) provided at a second axial end of the filter element (21);
wherein the first end part (26) of the filter element comprises an axial passage (29) configured to receive slideable and sealingly a bypass valve member (35) of a core element (38), which core element (38) comprises a perforated tube (39) having transverse outer dimensions that are smaller than transverse inner dimensions of the tubular wall (25), which bypass valve member (35) is provided at one end of the perforated tube (39), is tubular and moveably attached to the perforated tube (39) for movement in axial direction with respect to the perforated tube (39) between an extended position and a retracted position;
wherein the first end part (26) comprises a tubular portion (28) defining the axial passage (29);
wherein the tubular portion (28) comprises a wall (30) which is provided with a radial flow passage (34) configured to be radially overlapped by the bypass valve member (35) for closing the radial flow passage (34) when the bypass valve member (35) is in the extended position, and to be exposed at least partly by the bypass valve member (35) when the bypass valve member is in the retracted position to allow flow in radial direction between the internal (33) of the tubular portion (28) and external (43) of the tubular portion (28).

16. Filter element (21) according to clause 15, wherein the transverse inner dimensions of the tubular wall (25) mate with the transverse outer dimensions of the perforated tube (39) supporting the tubular wall (25) internally.

17. Filter element (21) according to clause 15 or 16, wherein a first annular seal member (147) is provided in the axial passage (29) configured for sealing engagement with the bypass valve member (35).

18. Filter element (21) according to one of clauses 15-17, wherein the tubular portion (28) is internally provided with a second annular seal member (145) configured to engage sealingly with an axial end of the bypass valve member (35) when the bypass valve member (35) is in the extended position.

19. Filter element (21) according to clause 18, wherein the second seal member (145) is provided with a sealing material different than the tubular portion (28).

20. Filter element (21) according to one of clauses 15-19, wherein the tubular portion (28) is provided with a third annular seal member (53) configured for sealing engagement in an aperture of a filter device, which third seal member (53) is provided distally from the radial flow passage (34).

Taking into account that the bypass valve member 35 is carried by the perforated tube 39 (see FIG. 2) and telescopically moveable attached to this perforated tube, it is clear that when the filter element according to the invention is in a condition separate from the rest of the filter assembly—for example when it is in stock—, the slideable valve member 35 is not a part of the filter element according to the invention as it is separate from it. This means that in said condition wherein the filter element according to the invention is separate from the rest of the filter assembly:

the first seal member 147 is exposed to the axial flow passage 29 through the tubular portion 28; and/or the inner surface of the tubular portion 28 facing the axial flow passage 29 is fully exposed to the flow passage 29; and/or no axially slideable member, such as a slideable valve member 35, is provided in the axial flow passage 29 through the tubular portion 28.

It is noted that the above invention is not limited to the above-described examples of filter assemblies. In particular it is noted that the invention is also applicable to filter assemblies which are used for filtering gaseous media in which particles are entrained. In such applications it is also relevant that when the filter element needs to be exchanged, that flow of the gaseous media is prohibited when separating the filter housing from the filter head.

Furthermore, it is also conceivable that the filter assembly comprises a filter head that is adapted to be coupled to more than one filter housing, for example two. Such filter head may also be formed by a manifold that holds several valve assemblies that opens or closes access to different filter assemblies.

While the subject-matter has been illustrated in the drawings and the foregoing description, such illustration and description are to be considered illustrative or exemplary and not restrictive; the subject-matter is not limited to the disclosed embodiments. Other variations to the disclosed embodiments can be understood and effected by those skilled in the art of practicing the claimed subject-matter, from a study of the drawings, the disclosure and the appended claims. Use of the verb "comprise" and its conjugations does not exclude the presence of other elements other than those stated in a claim or in the description. Use of the indefinite article "a" or "an" preceding an element or step does not exclude the presence of a plurality of such elements or steps. The Figures and description are to be regarded as illustrative only and do not limit the subject-matter. Any reference sign in the claims should not be construed as limiting the scope.

The invention claimed is:

1. Combination of a core element and a replaceable filter element,
    wherein the filter element comprises:
        a tubular wall of filtration medium for collecting material entrained in a fluid stream passing through the tubular wall, and
        a first end part provided at a first axial end of the filter element,
    wherein the core element comprises:
        a perforated tube having transverse outer dimensions which are smaller than transverse inner dimensions of the tubular wall and over which tube the filter element is removably receivable, and
        a bypass valve member provided at one end of the perforated tube, which bypass valve member is tubular and moveably coupled to the perforated tube for movement in axial direction with respect to the perforated tube between an extended position and a retracted position,
    wherein the first end part of the filter element comprises an axial passage configured to receive the bypass valve member slideable and sealingly when the filter element is received over the perforated tube of the core element,
    wherein the first end part comprises a tubular portion defining the axial passage, the tubular portion having a proximal tube portion and a distal tube portion with respect to the filtration medium;
    wherein the tubular portion comprises a wall, which is provided with a radial flow passage, which radial flow passage is provided between the proximal tube portion and the distal tube portion;
    wherein, in the extended position, the bypass valve member radially overlaps the radial flow passage to close the radial flow passage; and
    wherein, in the retracted position, the radial flow passage is at least partly exposed by the bypass valve member to allow flow in radial direction between the internal of the tubular portion and external of the tubular portion.

2. The combination according to claim 1, wherein the perforated tube has transverse outer dimensions mating the transverse inner dimensions of the tubular wall to support the tubular wall internally.

3. The combination according to claim 1, wherein a first annular seal member is provided in the axial passage for sealing engagement with the bypass valve member.

4. The combination according to claim 1, wherein the tubular portion is internally provided with a second annular seal member to engage sealingly with an axial end of the bypass valve member when the bypass valve member is in the extended position.

5. The combination according to claim 4, wherein the second seal member is provided with a seal part of a material different than the tubular portion.

6. The combination according to claim 4, wherein the second seal member is provided, viewed with respect to the filter element, distally from the radial flow passage.

7. The combination according to claim 5, wherein the second seal member is provided, viewed with respect to the filter element, distally from the radial flow passage.

8. The combination according to claim 1, wherein the tubular portion is provided with a seal part to engage sealingly with an axial end of the bypass valve member when the bypass valve member is in the extended position.

9. The combination according to claim 8, wherein the bypass valve member is provided a sharp-edged rim on its axial end, which rim extends in axial direction towards the seal part.

10. The combination according to claim 8, wherein the bypass valve member is provided a seal member on its axial and that faces the seal part.

11. The combination according to claim 1, wherein the tubular portion is externally provided with a third annular seal member for sealing engagement in an aperture of a filter device, which third seal member is provided, viewed with respect to the filter element, distally from the radial flow passage.

12. The combination according to claim 1, wherein the core element is provided with a resilient member pretensioning the bypass valve member towards the extended position.

13. The combination according to claim 12, wherein the resilient member is a helically wound, cylindrical spring arranged inside the core element.

14. The combination according to claim 12, wherein the core element is provided with a support ridge supporting the resilient member.

15. The combination according to claim 13, wherein the core element is provided with a support ridge supporting the resilient member.

16. The combination according to one claim 1, wherein the bypass valve member is provided with a pressure ridge facing in the direction of the extended position to press the bypass valve member towards the retracted position under the influence of the pressure exerted by the fluid on the pressure ridge.

17. The combination according to claim 16, wherein the bypass valve member is provided with a diameter reduction providing the pressure ridge facing in the direction of the extended position.

18. The combination according to claim 16, wherein the bypass valve member is provided with a diameter enlargement providing the pressure ridge facing in the direction of the extended position.

19. The combination according to claim 1, wherein the bypass valve member is made from a wear-resistant material.

20. The combination according to claim 19, wherein the wear resistant material is a metal.

21. The combination according to claim 19, wherein the wear resistant material is a steel.

22. A filter element comprising:
a tubular wall of filtration medium for collecting material entrained in a fluid stream passing through the tubular wall, a first end part fixedly attached to a first axial end of the filter element, and a second end part provided at a second axial end of the filter element;
wherein the first end part of the filter element comprises, as an integral part of the first end part, a tubular portion having a wall defining an axial passage, which wall is provided with a radial flow passage;
wherein the tubular portion has a proximal tube portion and a distal tube portion with respect to the filter medium; and
wherein the radial flow passage is provided between the proximal tube portion and the distal tube portion;
wherein said tubular wall of filtration medium is configured for receiving a core element comprising:
a perforated tube having transverse outer dimensions that are smaller than transverse inner dimensions of said tubular wall of filtration medium, and
a bypass valve member provided at one end of the perforated tube, which bypass valve member is tubular and moveably attached to the perforated tube for movement in axial direction with respect to the perforated tube between an extended position and a retracted position;
wherein the axial passage is configured to receive the bypass valve member slideable and sealingly when the filter element is received over the perforated tube of the core element;
wherein the radial flow passage is configured to be radially overlapped by the bypass valve member for closing the radial flow passage when the bypass valve member is in the extended position, and to be exposed at least partly by the bypass valve member when the bypass valve member is in the retracted position to allow flow in radial direction between the internal of the tubular portion and external of the tubular portion.

23. The filter element according claim 22, wherein the tubular portion is provided with a third annular seal member extending outside the tubular portion along the circumference of the tubular portion.

24. The filter element according to claim 23, wherein the third seal member is, viewed from the internal of the tubular wall, arranged distally from the radial passage.

25. The filter element according claim 23, wherein the third seal member is carried by the tubular portion.

26. The filter element according to claim 22, wherein the inner surface of the tubular portion facing the axial flow passage is fully exposed to the flow passage.

27. The filter element according to claim 22, wherein no axially slideable member, such as a slideable valve member, is provided in the axial flow passage through the tubular portion.

28. The filter element according to claim 22,
wherein a first annular seal member is provided in the axial passage,
wherein the distal tube portion of the tubular portion is provided with a second annular seal member extending inside the distal tube portion along the circumference of the tube portion, and
wherein, viewed from the internal of the tubular wall, the second seal member is arranged distally from the radial passage.

29. The filter element according to claim 28, wherein the first seal member has an internal diameter (d3) and the second seal member has an internal diameter (d2) being unequal to the internal diameter (d3) of the first seal member.

30. The filter element according to claim 29, wherein the second seal member is provided with a seal part of a material different than the tubular portion.

31. The filter element according to claim 28, wherein the second seal member is provided with a seal part of a material different than the tubular portion.

32. The filter element according to claim 28, wherein the second seal member comprises a ring-shaped seal ridge which is defined by a narrowing of the internal of the tubular portion.

33. The filter element according to claim 28, wherein the second seal member has a sealing seat facing axially to the internal of the tubular portion.

34. The filter element according claim 28, wherein the first seal member is carried by the tubular portion.

35. The filter element according to claim 28, wherein the first seal member is exposed to the axial flow passage through the tubular portion.

36. The filter element according claim 28, wherein the second seal member is carried by the tubular portion.

37. The filter element according to claim 28, wherein the first seal member has an internal diameter (d3) and the second seal member has an internal diameter (d2) smaller than the internal diameter (d3) of the first seal member.

38. The filter element according to claim 22,
wherein a first annular seal member is provided in the axial passage for sealing engagement with the bypass valve member,
wherein the distal tube portion of the tubular portion is provided with a second annular seal member extending inside the distal tube portion along the circumference of the tube portion, and
wherein, viewed from the internal of the tubular wall, the second seal member is arranged distally from the radial passage.

* * * * *